(12) United States Patent
Hayakawa et al.

(10) Patent No.: US 11,225,541 B2
(45) Date of Patent: Jan. 18, 2022

(54) PRODUCTION METHOD FOR DISC-SHAPED POLYMER PARTICLES

(71) Applicant: Nisshinbo Holdings Inc., Tokyo (JP)

(72) Inventors: Kazutoshi Hayakawa, Chiba (JP); Toshifumi Hashiba, Chiba (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 0 days.

(21) Appl. No.: 17/053,125

(22) PCT Filed: Apr. 15, 2019

(86) PCT No.: PCT/JP2019/016077
§ 371 (c)(1),
(2) Date: Nov. 5, 2020

(87) PCT Pub. No.: WO2019/216126
PCT Pub. Date: Nov. 14, 2019

(65) Prior Publication Data
US 2021/0246250 A1    Aug. 12, 2021

(30) Foreign Application Priority Data

May 9, 2018  (JP) .............................. JP2018-090760

(51) Int. Cl.
*C08F 283/06* (2006.01)
(52) U.S. Cl.
CPC .................................. *C08F 283/06* (2013.01)
(58) Field of Classification Search
CPC ....... C08F 2500/24; C08F 2/50; C08F 283/06
See application file for complete search history.

(56) References Cited

U.S. PATENT DOCUMENTS

| | | |
|---|---|---|
| 4,948,772 A | 8/1990 | Hoshino et al. |
| 2006/0052549 A1 | 3/2006 | Hashiba et al. |
| 2018/0134823 A1 | 5/2018 | Hayakawa et al. |

FOREIGN PATENT DOCUMENTS

| | | |
|---|---|---|
| JP | 62-104706 A | 5/1987 |
| JP | 2-14222 A | 1/1990 |

(Continued)

OTHER PUBLICATIONS

International Search Report w/English translation and Written Opinion in Japanese dated May 21, 2019, issued in counterpart International Application No. PCT/JP2019/016077 (8 pages).

*Primary Examiner* — Mark S Kaucher
(74) *Attorney, Agent, or Firm* — Westerman, Hattori, Daniels & Adrian, LLP

(57) ABSTRACT

This production method is for disc-shaped polymer particles having an average aspect ratio of 1-1.3. The method comprises conducting, in a solvent, solution polymerization of monomers including a hydrophobic unsaturated monomer which is liquid at 25° C., in the presence of a polymerization initiator, a surfactant, and/or a polymer stabilizer, wherein a solvent mixture containing water, a hydrophilic organic solvent, and a hydrophobic organic solvent is used as the solvent, and, as the polymerization initiator, one or more polymerization initiators soluble in at least one of water, the hydrophilic organic solvent, and the hydrophobic organic solvent are used as a combination that is soluble in all of water, the hydrophilic organic solvent, and the hydrophobic organic solvent, such that the hydrophobic unsaturated monomer, water, the hydrophilic organic solvent, and the hydrophobic organic solvent are mixed at a predetermined ratio.

10 Claims, 2 Drawing Sheets

(56) References Cited

FOREIGN PATENT DOCUMENTS

| | | | |
|---|---|---|---|
| JP | 6-192308 | A | 7/1994 |
| JP | 2007-91626 | A | 4/2007 |
| JP | 2008-111132 | A | 5/2008 |
| JP | 2009-235353 | A | 10/2009 |
| JP | 2009-235355 | A | 10/2009 |
| JP | 2010-222444 | A | 10/2010 |
| JP | 2016-204491 | A | 12/2016 |
| WO | 2004/026945 | A1 | 4/2004 |
| WO | 2016/181877 | A1 | 11/2016 |

PRODUCTION METHOD FOR DISC-SHAPED POLYMER PARTICLES

TECHNICAL FIELD

The present invention relates to a novel production method for disc-shaped polymer particles.

BACKGROUND ART

A micron-sized polymer particle and an inorganic particle are used as a filler or a specimen in various fields such as an electronic/electrical material, an optical material, a paint, an ink, a construction material, a biological/pharmaceutical material, and cosmetics. Among the particles, an irregularly shaped particle different from a spherical particle can exhibit various properties different from properties of the spherical particle in terms of optical properties, tactile sensation, and the like, and therefore has been actively developed, and application development thereof has also been promoted in recent years.

The present inventors also have promoted development of an elliptic spherical or acicular polymer particle having a high aspect ratio so far, and have found various particles superior to a conventional spherical particle in properties such as concealing property, light diffusibility, and tactile sensation (Patent Documents 1 and 2). Furthermore, the present inventors have performed application development of these particles and have found a flat elliptic spherical polymer particle (Patent Document 3). Development of a novel polymer particle has been promoted in the technical field in order to further improve the properties.

Among the developments, application development of a disc-shaped polymer particle or a flat polymer particle similar thereto is being actively promoted (Patent Documents 4 to 7). The disc-shaped polymer particle can exhibit various different properties including optical properties such as concealing property and tactile sensation while maintaining lightness and light feeling unique to the disc-shaped polymer particle. Therefore, application development thereof such as cosmetics, a paint, or an anti-blocking agent has been actively performed.

However, these particles are generally produced by preparing a dispersion in which spherical particles are dispersed, and (1) adding beads such as glass beads, zirconia beads, and metal beads to the dispersion, and mixing and stirring the resulting mixture to flatten the particles, (2) compressing the dispersion with a pressure device such as two rolls or a pressure press machine under heating conditions to flatten the particles, or (3) performing seed crosslinking or the like using a crosslinking component or adjusting flattening by utilizing solubility of a different component. That is, these particles are flattened by physical and chemical methods based on primary spherical particles, and further development thereof is required in terms of efficiency, accuracy, and cost.

PRIOR ART DOCUMENTS

Patent Documents

Patent Document 1: JP-A 2009-235353
Patent Document 2: JP-A 2009-235355
Patent Document 3: WO 2016/181877
Patent Document 4: JP-A 562-104706
Patent Document 5: JP-A 2007-91626
Patent Document 6: JP-A 2008-111132
Patent Document 7: JP-A 2016-204491

SUMMARY OF INVENTION

Technical Problem

The present invention has been achieved in view of the above circumstances, and an object of the present invention is to provide a novel method capable of efficiently producing disc-shaped polymer particles.

Solution to Problem

The present inventors made intensive studies in order to solve the above problems. As a result, the present inventors have found that by mixing a raw material monomer and a solvent at a predetermined compounding ratio and conducting solution polymerization, disc-shaped polymer particles can be efficiently and accurately produced without preparing primary particles, and have completed the present invention.

That is, the present invention provides the following production method for disc-shaped polymer particles.

1. A production method for disc-shaped polymer particles satisfying the following condition (1) that (1) an aspect ratio (L/D) average ($P^1_{AV}$) calculated from a longest diameter (L) and a shortest diameter (D) of a flat portion is $1 \leq P^1_{AV} \leq 1.3$, the method including conducting, in a solvent, solution polymerization of monomers including a hydrophobic unsaturated monomer which is liquid at 25° C., in the presence of a polymerization initiator, a surfactant, and/or a polymer stabilizer, wherein a solvent mixture containing water, a hydrophilic organic solvent, and a hydrophobic organic solvent is used as the solvent, and as the polymerization initiator, one or more polymerization initiators soluble in at least one of the water, the hydrophilic organic solvent, and the hydrophobic organic solvent are used as a combination that is soluble in all of the water, the hydrophilic organic solvent, and the hydrophobic organic solvent, such that a compounding ratio among the hydrophobic unsaturated monomer, the water, the hydrophilic organic solvent, and the hydrophobic organic solvent satisfies the following conditions (A) to (C):

(A) a weight ratio (W/M) of the water (W) to the hydrophobic unsaturated monomer (M) is $0.8 \leq W/M \leq 1.5$;

(B) a weight ratio (O/H) of the hydrophobic organic solvent (O) to the hydrophilic organic solvent (H) is $0.7 \leq O/H \leq 1.8$; and (C) a weight ratio ((O+M)/W) of the sum of the hydrophobic organic solvent (O) and the hydrophobic unsaturated monomer (M) to the water (W) is $0.6 \leq (O+M)/W \leq 1.25$.

2. The production method for disc-shaped polymer particles according to 1, wherein the disc-shaped polymer particles further satisfy the following condition (2):

(2) an aspect ratio (L/T) average ($P^2_{AV}$) calculated from the longest diameter (L) of the flat portion and a thickness (T) of a side surface is $1.5 < P^2_{AV} \leq 50$.

3. The production method for disc-shaped polymer particles according to 1 or 2, wherein the disc-shaped polymer particles further satisfy the following condition (3):

(3) a longest diameter (L) average ($L_{AV}$) of the flat portion is $0.1 \leq L_{AV} \leq 500$ μm.

4. The production method for disc-shaped polymer particles according to any one of 1 to 3, wherein the disc-shaped polymer particles further satisfy the following condition (4):

(4) a volume mean particle size (MV) according to a particle size distribution is 0.1≤MV≤200 μm.
5. The production method for disc-shaped polymer particles according to any one of 1 to 4, wherein the disc-shaped polymer particles further satisfy the following condition (5):
(5) a variation width (SD) is 0.1≤SD≤30.
6. The production method for disc-shaped polymer particles according to any one of 1 to 5, wherein a disc-shaped polymer particle constituting the disc-shaped polymer particles has a shape covered with a continuous straight or curved line and a continuous flat or curved surface generated by a change in tension at an interface.
7. The production method for disc-shaped polymer particles according to any one of 1 to 6, wherein the disc-shaped polymer particles are used for cosmetics.
8. The production method for disc-shaped polymer particles according to any one of 1 to 7, wherein the polymerization initiator is a combination of at least one water-soluble initiator and at least one oil-soluble initiator.
9. The production method for disc-shaped polymer particles according to any one of 1 to 8, wherein the hydrophobic organic solvent is an organic compound having a molecular weight of 200 or more.
10. The production method for disc-shaped polymer particles according to any one of 1 to 9, wherein the hydrophobic organic solvent has ability to dissolve the hydrophobic liquid unsaturated monomer and does not have ability to dissolve a disc-shaped polymer particle generated by a polymerization reaction.

Advantageous Effects of Invention

According to the production method of the present invention, by conducting solution polymerization of monomers under the above conditions, disc-shaped polymer particles can be produced in a single step, and can be produced by a batch method without including a particle compression/transfer step. Therefore, the disc-shaped polymer particles can be mass-produced collectively without going through a plurality of steps.

In addition, disc-shaped polymer particles obtained by the method of the present invention have unique properties in terms of light diffusibility, UV cuttability, tactile sensation, fluidity, and the like, and can be preferably used as an additive for cosmetics, a paint, an ink, a film sheet, a molded product, and the like.

DESCRIPTION OF EMBODIMENTS

Figure 1:
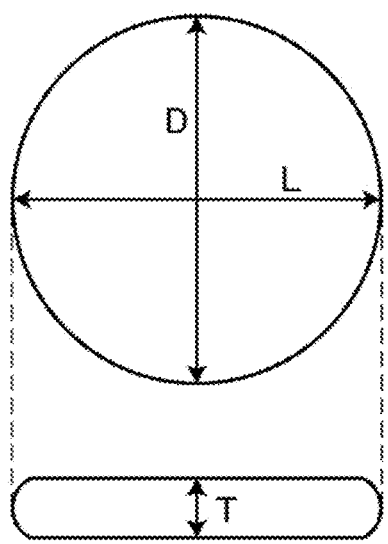
FIG. 1 is a diagram illustrating a long diameter (L), a short diameter (D), and a thickness (T) of a disc-shaped polymer particle.

The production method for disc-shaped polymer particles of the present invention is a production method for disc-shaped polymer particles satisfying the following condition (1), the method including conducting, in a solvent, solution polymerization of monomers including a hydrophobic unsaturated monomer which is liquid at 25° C., in the presence of a polymerization initiator, a surfactant, and/or a polymer stabilizer.

(1) An aspect ratio (L/D) average ($P^1_{AV}$) calculated from a longest diameter (L) and a shortest diameter (D) of a flat portion is $1 \leq P^1_{AV} \leq 1.3$.

In the present invention, the solution polymerization is defined as a polymerization method for allowing a polymerization reaction to proceed in a solvent containing at least a monomer and a polymerization initiator to precipitate or generate a polymer particle. Specific examples of the solution polymerization method include a suspension polymerization method, an emulsion polymerization method, a dispersion polymerization method, a seed polymerization method, and a composite method according to these methods.

The suspension polymerization method is a method for mechanically stirring a monomer and a polymerization initiator or the like soluble in the monomer in a medium in which the monomer and the polymerization initiator or the like are hardly soluble, and allowing a polymerization reaction to proceed in a suspended state to precipitate or generate a polymer particle. The emulsion polymerization method is a method for mixing a medium such as water with a monomer, a surfactant (emulsifier), or the like hardly soluble in this medium, adding a polymerization initiator soluble in the medium thereto, and allowing a polymerization reaction to proceed to precipitate or generate a polymer particle. The dispersion polymerization method is a method for allowing a polymerization reaction to proceed in a uniform solution in which a monomer, an initiator, a dispersion stabilizer, and the like are dissolved in a liquid medium in which the monomer is soluble but a polymerized product thereof is not soluble to precipitate or generate a polymer particle. The seed polymerization method is a polymerization method for adding another particle serving as a nucleus before a polymerization reaction and conducting the polymerization reaction on a surface of the particle.

Disc-shaped polymer particles can be obtained by these various solution polymerization methods. However, the suspension polymerization, the emulsion polymerization, the dispersion polymerization, or a combination thereof is more preferably used. According to these methods, a step of preparing a seed particle as in the seed polymerization can be omitted.

In the method of the present invention, a solvent mixture of water, a hydrophilic organic solvent, and a hydrophobic organic solvent is used as a solvent. It is preferable to select a hydrophilic organic solvent and a hydrophobic organic solvent mixed (compatible) with each other. Furthermore, it is preferable to select a solvent in which a monomer serving as a principal component (more than 50% by weight) of monomers used for polymerization is soluble in at least one of a hydrophilic organic solvent and a hydrophobic organic solvent. Note that in the present invention, the hydrophilic organic solvent means such a solvent that a mixed liquid thereof with water having the same volume maintains a uniform appearance, and the hydrophobic organic solvent means such a solvent that a mixed liquid thereof with pure water having the same volume cannot maintain a uniform appearance after the mixed liquid is gently stirred at 1 atm (1.013×10⁵ Pa) at a temperature of 20° C. and flowing stops.

Examples of the water include tap water, deionized water, and distilled water. Examples of the hydrophilic organic solvent include methanol, ethanol, 1-propanol, 2-propanol, ethylene glycol, propylene glycol, butylene glycol, dipropylene glycol, methyl cellosolve, ethyl cellosolve, propyl cellosolve, methyl cellosolve acetate, ethyl cellosolve acetate, methyl carbitol, ethyl carbitol, butyl carbitol, ethyl carbitol acetate, acetone, tetrahydrofuran, dimethylformamide, N-methyl-2-pyrrolidone, and acetonitrile. These solvents can be used singly or in combination of two or more type thereof.

Examples of the hydrophobic organic solvent include: a higher alcohol such as 1-butanol, 2-butanol, isobutanol, tert-butanol, 1-pentanol, 2-pentanol, 3-pentanol, 2-methyl-1-butanol, isopentyl alcohol, tert-pentyl alcohol, 1-hexanol, 2-methyl-1-pentanol, 4-methyl-2-pentanol, 2-ethylbutanol, 1-heptanol, 2-heptanol, 3-heptanol, 2-octanol, 2-ethyl-1-hexanol, benzyl alcohol, or cyclohexanol; an ether alcohol such as butyl cellosolve; a polyether such as polypropylene glycol or polybutylene glycol; a ketone such as methyl ethyl ketone, methyl isobutyl ketone, or cyclohexanone; an ester such as ethyl acetate, butyl acetate, ethyl propionate, or butyl carbitol acetate; an aliphatic or aromatic hydrocarbon such as pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, dicyclohexyl, benzene, toluene, xylene, ethylbenzene, liquid paraffin, mineral oil, or heat transfer oil; a siloxane compound such as polydimethylsiloxane, polymethylphenylsiloxane, polydiphenylsiloxane, or silicone oil; and a halogenated hydrocarbon such as carbon tetrachloride, trichloroethylene, chlorobenzene, or tetrabromoethane. Note that these hydrophobic organic solvents may each contain a modified compound replaced with carbon, nitrogen, oxygen, hydrogen, halogen, or the like, or a modified polymer compound such as a copolymer as long as the effect of the present invention is not impaired. These solvents can be used singly or in combination of two or more type thereof.

In particular, as the hydrophobic organic solvent, it is preferable to use a hydrophobic organic solvent having 8 or more carbon atoms, the hydrophobic organic solvent not reacting with a raw material monomer under polymerization conditions. By allowing such a hydrophobic organic solvent to coexist in the reaction system, dispersibility of a polymer particle generated can be improved, and a particle size can be controlled more uniformly.

The organic compound having 8 or more carbon atoms is not particularly limited as long as the organic compound is solid or liquid at room temperature, is compatible with a hydrophilic organic solvent used, and does not adversely affect a polymerization reaction. However, considering a polymerization reaction temperature and the like, a compound having a melting point of 80° C. or lower is preferable, a compound having a melting point of 60° C. or lower is more preferable, a compound having a melting point of 40° C. or lower is still more preferable, and a compound having a melting point of 30° C. or lower is most preferable.

Examples of such an organic compound include a hydrocarbon compound, a siloxane compound, and a polyalkylene oxide group-containing compound. The number of carbon atoms only needs to be 8 or more. However, considering dispersion stability of an obtained particle, the number of carbon atoms is preferably 10 or more, more preferably 12 or more, and most preferably 15 or more.

The molecular weight of the hydrophobic organic solvent is preferably 200 or more, more preferably 300 or more, still more preferably 500 or more, most preferably 1,000 or more. By using such a hydrophobic organic solvent with a large molecular weight, the hydrophobic organic solvent functions as a solvent and plays a role as a dispersant at the same time. Therefore, it is possible to obtain polymer particles whose sticking and aggregation are suppressed, which are stably monodispersed, and whose particle sizes are controlled.

The hydrophobic organic solvent having a molecular weight of 200 or more is preferably a polymer compound having a repeating unit. Specific examples thereof include a hydrocarbon compound, a siloxane compound, and a polyalkylene oxide group-containing compound. In particular, these polymer compounds are more preferably polymer compounds that are water-soluble in a low-molecular state and become hydrophobic as the compounds are polymerized, or hydrophobic organic solvents obtained by polymerizing a monomer having a polar group in a molecule thereof. A polymer compound having such a polar group in a molecule thereof makes it easy for a polymer stabilizer described later to be uniformly dispersed in the solvent and contributes to further particle stability. Examples of the polar group include a hydroxy group, an ether group, and a carbonyl group.

The hydrophobic organic solvent is preferably a solvent having ability to dissolve a hydrophobic liquid unsaturated monomer and not having ability to dissolve a disc-shaped polymer particle generated by a polymerization reaction.

Preferable examples of the hydrophobic organic solvent in the present invention include: a polyether such as polypropylene glycol or polybutylene glycol; a siloxane compound such as polydimethylsiloxane, polymethylphenylsiloxane, polydiphenylsiloxane, or silicone oil; and an aliphatic or aromatic hydrocarbon such as liquid paraffin or heat transfer oil.

Furthermore, the viscosity of the hydrophobic organic solvent is not particularly limited, but is preferably 1 mPa·s or more at 25° C.

In the production method of the present invention, as the polymerization initiator, one or more polymerization initiators soluble in at least one of water, a hydrophilic organic solvent, and a hydrophobic organic solvent are used as a combination that is soluble in all of water, the hydrophilic organic solvent, and the hydrophobic organic solvent.

In the method using three kinds of solvents of the present invention, when the three kinds of solvents are stirred, mixed, and allowed to stand, an emulsion layer (lower layer, water-rich layer), a dissolution layer (intermediate layer, hydrophilic solvent-rich layer), and a separation layer (upper layer, hydrophobic solvent-rich layer) coexist (in a fuzzy state), and it is presumed that a polymerization reaction proceeds in a state where an unsaturated monomer is dissolved in each of the layers in this fuzzy state even in the polymerization reaction. In a solvent system forming this fuzzy state, by further adopting the above-described combination of polymerization initiators, the polymerization reaction of the unsaturated monomer can proceed in a state where at least one polymerization initiator used is dissolved in all of water, the hydrophilic organic solvent, and the hydrophobic organic solvent, that is, in a state where at least one polymerization initiator used in each of the emulsion layer, the dissolution layer, and the separation layer is present. Probably because of this, the shape of an obtained polymer particle can be more efficiently formed into a disc shape.

As the "combination" of polymerization initiators, a single polymerization initiator that is soluble in all of water, the hydrophilic organic solvent, and the hydrophobic organic solvent can be used. However, it is preferable to use at least one water-soluble initiator that is soluble in water and at least one oil-soluble initiator that is insoluble in water in combination. Note that in the present invention, the water-soluble initiator means an initiator having a solubility of about 2 g or more/100 mL in water, and the oil-soluble initiator means an initiator having a solubility of about less than 2 g/100 mL in water.

In this case, a mixing ratio between the water-soluble initiator and the oil-soluble initiator is not particularly limited, but the ratio of water-soluble initiator:oil-soluble initiator is preferably 99:1 to 1:99, more preferably 95:5 to 5:95, still more preferably 90:10 to 10:90, further still more preferably 80:20 to 20:80, and most preferably 70:30 to 30:70 in terms of weight ratio.

As the polymerization initiator, various known polymerization initiators can be used. Examples of the water-soluble polymerization initiator include a water-soluble or ionic polymerization initiator including: a persulfate such as ammonium persulfate, sodium persulfate, or potassium persulfate; and an azo-based initiator such as 2,2'-azobis[2-methyl-N-(2-hydroxyethyl) propionamide], 2,2'-azobis(2-amidinopropane) dihydrochloride, 2,2'-azobis(2-methyl-N-phenylpropionamidine) dihydrochloride, 2,2'-azobis[N-(4-chlorophenyl)-2-methylpropionamidine]dihydrochloride, 2,2'-azobis[N-(4-hydroxyphenyl)-2-methylpropionamidine] dihydrochloride, 2,2'-azobis[N-(4-amino-phenyl)-2-methylpropionamidine]tetrahydrochloride, 2,2'-azobis[2-methyl-N (phenylmethyl)propionamidine]dihydrochloride, 2,2'-azobis [2-methyl-N-2-propenylpropionamidine]dihydrochloride, 2,2'-azobis[N-(2-hydroxyethyl)-2-methylpropionamidine] dihydrochloride, 2,2'-azobis[2-(5-methyl-2-imidazolin-2-yl) propane]dihydrochloride, 2,2'-azobis[2-(2-imidazolin-2-yl) propane]dihydrochloride, 2,2'-azobis[2-(4,5,6,7-tetrahydro-1H-1,3-diazepin-2-yl)propane]dihydrochloride, 2,2'-azobis [2-(3,4,5,6-tetrahydropyrimidin-2-yl) propane] dihydrochloride, 2,2'-azobis[2-(5-hydroxy-3,4,5,6-tetrahydropyrimidin-2-yl)propane]dihydrochloride, 2,2'-azobis{2-[1-(2-hydroxyethyl)-2-imidazolin-2-yl]propane} dihydrochloride, disodium 2,2'-azobis-2-cyanopropane-1-sulfonate, or sodium 4,4'-azobis(4-cyanopentanoate).

Examples of the oil-soluble initiator include an oil-soluble polymerization initiator including: a peroxide such as benzoyl peroxide, cumene hydroperoxide, or tert-butyl hydroperoxide; and an azo-based compound such as azobisisobutyronitrile (AIBN), azobismethylbutyronitrile, azobisisovaleronitrile, dimethyl 2,2'-azobis(isobutyrate), 2,2'-azobis(N-butyl-2-methylpropionamide), 4,4'-azobis(4-cyanopentanoic acid), 2,2'-azobis(2-amidinopropane) dihydrochloride, or 2,2'-azobis(N,N'-dimethyleneisobutylamidine) dihydrochloride.

These polymerization initiators can be used singly or in combination of two or more types thereof. The compounding amount of a radical polymerization initiator is usually preferably 0.01 to 50 parts by weight per 100 parts by weight of unsaturated monomers.

In the production method of the present invention, a polymer stabilizer and a surfactant (emulsifier) are used. Examples of the polymer stabilizer include various hydrophobic or hydrophilic stabilizers including: a polystyrene derivative such as polyhydroxystyrene, polystyrene sulfonic acid, a hydroxystyrene-(meth)acrylate copolymer, a styrene-(meth)acrylate copolymer, or a styrene-hydroxystyrene-(meth)acrylate copolymer; a poly(meth)acrylic acid derivative such as poly(meth)acrylic acid, poly(meth)acrylamide, polyacrylonitrile, polyethyl (meth)acrylate, or polybutyl (meth)acrylate; a polyether and a derivative thereof, such as polyethylene glycol, polymethyl vinyl ether, polyethyl vinyl ether, polybutyl vinyl ether, or polyisobutyl vinyl ether; a cellulose derivative such as cellulose, methyl cellulose, cellulose acetate, cellulose nitrate, hydroxymethyl cellulose, hydroxyethyl cellulose, hydroxypropyl cellulose, or carboxymethyl cellulose; a polyvinyl acetate derivative such as polyvinyl alcohol, polyvinyl butyral, polyvinyl formal, or polyvinyl acetate; a nitrogen-containing polymer derivative such as polyvinyl pyridine, polyvinyl pyrrolidone, polyethylene imine, or poly-2-methyl-2-oxazoline; and a polyvinyl halide derivative such as polyvinyl chloride or polyvinylidene chloride. These compounds can be used singly or in combination of two or more types thereof.

Specific examples of the surfactant (emulsifier) include: an anionic surfactant such as an alkyl sulfate including sodium dodecyl sulfate; an alkylbenzene sulfonate including sodium dodecylbenzenesulfonate, an alkylnaphthalenesulfonate, a fatty acid salt, an alkylphosphate, or an alkylsulfosuccinate; a cationic surfactant such as an alkylamine salt, a quaternary ammonium salt, an alkylbetaine, or an amine oxide; and a nonionic surfactant such as a polyoxyethylene alkyl ether, a polyoxyethylene alkyl allyl ether, a polyoxyethylene alkyl phenyl ether, a sorbitan fatty acid ester, a glycerin fatty acid ester, a sucrose fatty acid ester, or a polyoxyethylene fatty acid ester. These compounds can be used singly or in combination of two or more types thereof.

The amount of the polymer stabilizer used is preferably 0.01 to 50 parts by weight per 100 parts by weight of raw material unsaturated monomers. The amount of the surfactant used is preferably 0.01 to 50 parts by weight per 100 parts by weight of raw material unsaturated monomers. By using the polymer stabilizer and the surfactant, it is possible to more stably control the average long diameter, the average short diameter, the average thickness, and the like of the disc-shaped polymer particles. The polymer stabilizers and the surfactants can be each used singly or in combination of two or more types thereof.

In the production method of the present invention, the pH of the reaction system is not particularly limited, and usually, disc-shaped polymer particles can be obtained without adjusting the pH. However, by adjusting the pH of the solution to 0 to 5 or 9 to 14 during a polymerization reaction (at least from start of heating to an end of the reaction) and polymerizing an unsaturated monomer, it is possible to obtain monodispersed polymer particles with few aggregates and impurities while maintaining the disk shape. The pH of the reaction solution is preferably 0 to 4 or 10 to 14, more preferably 0 to 3 or 11 to 14, and most preferably 0 to 2 or 12 to 14. The pH is preferably 0 to 5 because the polymerization reaction proceeds more stably when the reaction proceeds by shifting the pH to an acid side.

In order to adjust the pH, it is only required to use a known pH adjuster appropriately. Examples of the pH adjuster include: an acid such as citric acid, tartaric acid, lactic acid, glycolic acid, hydrochloric acid, nitric acid, sulfuric acid, sodium citrate, sodium lactate, succinic acid, acetic acid, sodium acetate, fumaric acid, malic acid, or phosphoric acid; and an alkali such as sodium hydroxide, potassium hydroxide, calcium hydroxide, magnesium hydroxide, sodium carbonate, potassium carbonate, calcium carbonate, ammonium carbonate, ammonia, morpholine, triethanolamine, diethanolamine, dimethylamine, diethylamine, trimethylamine, or triethylamine.

It is only required to adjust the pH by gradually dropping the pH adjuster into the reaction solution after the polymerization reaction is started to change the pH to an acid side or an alkali side. Alternatively, if the above-described persulfate is used as the polymerization initiator, the pH is gradually lowered because the persulfate is decomposed during the polymerization reaction to generate an acid. In this case, the pH adjuster does not have to be added. Note that the pH of the reaction system in the present invention is a pH value of the reaction solution being stirred, the pH value being measured with a pH meter or a pH test sheet.

During the polymerization reaction, a catalyst (reaction accelerator) can be compounded depending on use or the like of an obtained particle. The compounding amount can be an appropriate amount that does not adversely affect particle physical properties, for example, 0.01 to 20% by weight with respect to the total weight of unsaturated monomers.

The catalyst is not particularly limited as long as being a positive catalyst, and a known catalyst can be appropriately selected and used. Specific examples thereof include: a tertiary amine such as benzyldimethylamine, triethylamine, tributylamine, pyridine, or triphenylamine; a quaternary ammonium compound such as triethylbenzylammonium chloride or tetramethylammonium chloride; a phosphine such as triphenylphosphine or tricyclophosphine; a phosphonium compound such as benzyltrimethylphosphonium chloride; an imidazole compound such as 2-methylimidazole or 2-methyl-4-ethylimidazole; an alkali metal hydroxide such as potassium hydroxide, sodium hydroxide, or lithium hydroxide; an alkali metal carbonate such as sodium carbonate or lithium carbonate; an alkali metal salt of an organic acid; and a Lewis acidic halide or a complex salt thereof, such as boron trichloride, boron trifluoride, tin tetrachloride, or titanium tetrachloride. These compounds can be used singly or in combination of two or more types thereof.

In order to adjust the mean particle size, shape, quality, and the like of obtained disc-shaped polymer particles during the polymerization reaction, it is also possible to add a compound that is soluble in water or a hydrophilic organic solvent and ionized into a cation and an anion such that a solution thereof exhibits electrical conductivity. Specific examples thereof include a salt, an inorganic acid, an inorganic base, an organic acid, an organic base, and an ionic liquid. The compounding amount thereof can be an appropriate amount that does not adversely affect particle physical properties, for example, 0.01 to 80% by weight with respect to the total weight of polymerization components.

In the production method for disc-shaped polymer particles of the present invention, solution polymerization is conducted under conditions in which a compounding ratio among the hydrophobic unsaturated monomer, water, the hydrophilic organic solvent, and the hydrophobic organic solvent satisfies the following conditions (A) to (C).

(A) A weight ratio (W/M) of the water (W) to the hydrophobic unsaturated monomer (M) is $0.8 \leq W/M \leq 1.5$.

(B) A weight ratio (O/H) of the hydrophobic organic solvent (O) to the hydrophilic organic solvent (H) is $0.7 \leq O/H \leq 1.8$.

(C) A weight ratio ((O+M)/W) of the sum of the hydrophobic organic solvent (O) and the hydrophobic unsaturated monomer (M) to the water (W) is 0.6 (O+M)/W 1.25.

In condition (A), a lower limit of W/M is preferably 0.9, more preferably 1.0, and still more preferably 1.1. Meanwhile, an upper limit of W/M is preferably 1.45, more preferably 1.4, and still more preferably 1.35. If W/M is less than 0.8, aggregates, sticking, and the like may increase and a desired monodispersed particle is not necessarily obtained. If W/M exceeds 1.5, $P^1_{AV}$ may exceed 1.3.

In condition (B), a lower limit of O/H is preferably 0.75, more preferably 0.9, and still more preferably 1.0. Meanwhile, an upper limit of O/H is preferably 1.6, more preferably 1.5, and still more preferably 1.4. If O/H is less than 0.7, it may be difficult to flatten a particle. If O/H exceeds 1.8, $P^1_{AV}$ may exceed 1.3.

In condition (C), a lower limit of (O+M)/W is preferably 0.7, more preferably 0.75, and still more preferably 0.8. Meanwhile, an upper limit of (O+M)/W is preferably 1.2, more preferably 1.1, and still more preferably 1.0. If (O+M)/W is less than 0.6, $P^1_{AV}$ may exceed 1.3. If (O+M)/W exceeds 1.25, aggregates, sticking, and the like may increase and a desired monodispersed particle is not necessarily obtained.

In the production method for disc-shaped polymer particles of the present invention, it is preferable to appropriately adjust also the weight ratio (W/H) of water (W) to the hydrophilic organic solvent (H) from viewpoints of the monodispersibility, flatness, stabilization of the disk shape, adjustment of the flatness, and the like of an obtained particle. Specifically, the following condition (D) is preferably satisfied.

$$1 \leq W/H \leq 20 \quad (D)$$

A lower limit of W/H is preferably 3, more preferably 5, and still more preferably 8. Meanwhile, an upper limit of W/H is preferably 18, more preferably 16, and still more preferably 15.

In order to impart characteristics such as fine unevenness on a surface, porosity, and a large specific surface area to a disc-shaped polymer particle, it is only required to appropriately adjust components and compositions of water, the hydrophilic organic solvent, and the hydrophobic organic solvent. This makes it possible to appropriately modify a surface and an inside of the particle.

In the present invention, by adjusting the solvent composition as described above, it is possible to control the mean particle size, aspect ratio, size of fine unevenness on a surface, and porosity of the disc-shaped polymer particles. Therefore, various properties such as water absorption and oil absorption can be controlled in a well-balanced manner.

The unsaturated monomer, which is a raw material of the disc-shaped polymer particles used in the production method of the present invention, contains at least a hydrophobic unsaturated monomer which is liquid at 25° C. Preferable examples of such a hydrophobic liquid unsaturated monomer include (i) styrene compound, (ii) hydrocarbon group-containing (meth)acrylic monomer, (iii) fluorine-containing (meth)acrylic monomer, (iv) olefin, (v) fluorinated olefin, (vi) conjugated diene, (vii) epoxy group-containing (meth)acrylic monomer, (viii) epoxy group-containing vinyl-based monomer, (ix) aromatic divinyl compound, (x)(poly)alkylene glycol-based di(meth)acrylate, (xi) alkanediol-based di(meth)acrylate, and (xii) polyfunctional(meth)acrylate.

Examples of (i) styrene compound include o-methylstyrene, m-methylstyrene, p-methylstyrene, α-methylstyrene, o-ethylstyrene, m-ethylstyrene, p-ethylstyrene, 2,4-dimethylstyrene, p-n-butylstyrene, p-t-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene.

Examples of (ii) hydrocarbon group-containing (meth)acrylic monomer include methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, octyl (meth) acrylate, nonyl (meth)acrylate, decyl (meth)acrylate, dodecyl (meth)acrylate, lauryl (meth)acrylate, stearyl (meth)

acrylate, cyclohexyl (meth)acrylate, isobornyl (meth)acrylate, phenyl (meth)acrylate, toluyl (meth)acrylate, and benzyl (meth)acrylate.

Examples of (iii) fluorine-containing (meth)acrylic monomer include 2,2,2-trifluoroethyl (meth)acrylate, 3,3,3-trifluoropropyl (meth)acrylate, 2-(perfluoroethyl) ethyl (meth)acrylate, 2-perfluoroethyl-2-perfluorobutylethyl (meth)acrylate, 2-perfluoroethyl (meth)acrylate, tetrafluoropropyl (meth)acrylate, perfluoromethyl (meth)acrylate, 1,1,1,3,3,3-hexafluoropropan-2-yl (meth)acrylate, 2-perfluoromethyl-2-perfluoroethylmethyl (meth)acrylate, 2-(perfluorohexyl) ethyl (meth)acrylate, 2-(perfluorodecyl) ethyl (meth)acrylate, and 2-(perfluorohexadecyl) ethyl (meth)acrylate.

Examples of (iv) olefin include ethylene and propylene.

Examples of (v) fluorinated olefin include vinyl fluoride, vinylidene fluoride, tetrafluoroethylene, and hexafluoropropylene.

Examples of (vi) conjugated diene include butadiene and isoprene.

Examples of (vii) epoxy group-containing (meth)acrylic monomer include glycidyl (meth)acrylate, (β-methyl) glycidyl (meth)acrylate, and 3,4-epoxycyclohexyl (meth)acrylate.

Examples of (viii) epoxy group-containing vinyl-based monomer include allyl glycidyl ether and 3,4-epoxy vinyl cyclohexane.

Examples of (ix) aromatic divinyl compound include divinylbenzene, divinylbiphenyl, and divinylnaphthalene.

Examples of (x) (poly) alkylene glycol-based di(meth)acrylate include (poly)ethylene glycol di(meth)acrylate, (poly)propylene glycol di(meth)acrylate, and (poly)tetramethylene glycol di(meth)acrylate.

Examples of (xi) alkanediol-based di(meth)acrylate include 1,6-hexanediol di(meth)acrylate, 1,8-octanediol di(meth)acrylate, 1,9-nonanediol di(meth)acrylate, 1,10-decanediol di(meth)acrylate, 1,12-dodecanediol di(meth)acrylate, 3-methyl-1,5-pentanediol di(meth)acrylate, 2,4-diethyl-1,5-pentanediol di(meth)acrylate, butylethylpropanediol di(meth)acrylate, 3-methyl-1,7-octanediol di(meth)acrylate, and 2-methyl-1,8-octanediol di(meth)acrylate.

Examples of (xii) polyfunctional (meth)acrylate include glycerin di(meth)acrylate, pentaerythritol tri(meth)acrylate, pentaerythritol tetra(meth)acrylate, pentaerythritol di(meth)acrylate, pentaerythritol tetra(meth)acrylate, glycerol acryloxy di(meth)acrylate, ethoxylated cyclohexanedimethanol di(meth)acrylate, ethoxylated bisphenol A di(meth)acrylate, tricyclodecane dimethanol di(meth)acrylate, propoxylated ethoxylated bisphenol A di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, caprolactone-modified dipentaerythritol hexa(meth)acrylate, caprolactone-modified hydroxypivalate neopentyl glycol di(meth)acrylate, polyester (meth)acrylate, and urethane (meth)acrylate.

Among these compounds, if monomers (vii) to (xii) are used, a disc-shaped polymer particle can be formed into a crosslinked polymer particle described later. Only monomers (vii) to (xii) may be used, but are preferably used in combination with monomers (i) to (vi). Specific examples of a production method for the crosslinked polymer particle include a method for adding polyfunctional unsaturated monomers (ix) to (xii) to monomers (i) to (vi) to increase the degree of crosslinking and a method for copolymerizing (vii) or (viii) unsaturated monomer under a predetermined pH condition to increase the degree of crosslinking. When monomers (vii) to (xii) are used in combination with monomers (i) to (vi), the amount of the monomers (vii) to (xii) used is preferably 0.01 to 80% by weight with respect to all the monomers.

The amount of the hydrophobic liquid unsaturated monomer used is preferably 50 to 100% by weight, more preferably 60 to 100% by weight, still more preferably 70 to 100% by weight, and further still more preferably 80 to 100% with respect to all the monomers used for the polymerization.

In addition to the hydrophobic liquid unsaturated monomer, another monomer may be used as long as the effect of the present invention is not impaired. As the other monomer, an unsaturated monomer having a reactive functional group such as a hydrophilic functional group or an active hydrogen group can be used. Examples of the reactive functional group include an amino group, a carboxy group, a hydroxy group, a thiol group, a carbonyl group, an ether group, a cyano group, an amide group, an alkylene oxide group, and an ionic functional group. Note that the unsaturated monomer may have one of the above functional groups or two or more types thereof. By introducing the reactive functional group such as a hydrophilic functional group or an active hydrogen group into an inside or a surface layer portion of a particle, a function such as hydrophilicity or oil resistance can be improved. In addition, the reactive functional group can be applied as an auxiliary functional group imparting various functions such as formation of a crosslinked structure by complexing an inorganic particle or another polymer particle or reaction of functional groups, surface treatment and surface modification by bonding of a reactive compound, and addition of an active substance.

Examples of the unsaturated monomer having such a reactive functional group include those illustrated below. Note that in the description below, "Cn" means that the number of carbon atoms is n.

(1) Amino Group-Containing Monomer

Examples of an amino group-containing monomer include: an amino group-containing (meth)acrylic monomer such as 2-aminoethyl (meth)acrylate, N-propylaminoethyl acrylate, N-ethylaminopropyl (meth)acrylate, N-phenylaminoethyl (meth)acrylate, or N-cyclohexylaminoethyl (meth)acrylate; an allylamine-based derivative such as allylamine or N-methylallylamine; an amino group-containing styrene derivative such as p-aminostyrene; and a triazine derivative such as 2-vinyl-4,6-diamino-S-triazine. Among these compounds, a compound having a primary or secondary amino group is preferable.

(2) Carboxyl Group-Containing Monomer

Examples of a carboxyl group-containing monomer include: an unsaturated carboxylic acid such as (meth)acrylic acid, crotonic acid, cinnamic acid, itaconic acid, maleic acid, or fumaric acid; a mono-C1-C8 alkyl itaconate such as monobutyl itaconate; a mono-C1-C8 alkyl maleate such as monobutyl maleate; a vinyl group-containing aromatic carboxylic acid such as vinyl benzoic acid, and salts thereof (3) Hydroxy Group-Containing Monomer Examples of a hydroxy group-containing monomer include: a hydroxy group-containing (meth)acrylic monomer such as 2-hydroxyethyl (meth)acrylate, 2-hydroxypropyl (meth)acrylate, 3-hydroxypropyl (meth)acrylate, or 4-hydroxybutyl (meth)acrylate; a hydroxyalkyl vinyl ether-based monomer such as hydroxyethyl vinyl ether or hydroxybutyl vinyl ether; and a hydroxy group-containing allyl monomer such as allyl alcohol or 2-hydroxyethyl allyl ether.

(4) Thiol (Mercapto) Group-Containing Monomer

Examples of a thiol (mercapto) group-containing monomer include a thiol group-containing (meth)acrylic monomer such as N-(2-mercaptoethyl)acrylamide, N-(2-mercapto-1-carboxyethyl) acrylamide, N-(2-mercaptoethyl) methacrylamide, N-(4-mercaptophenyl) acrylamide, N-(7-mercaptonaphthyl) acrylamide, maleic acid mono-2-mercaptoethylamide, 2-mercaptoethyl (meth)acrylate, or 2-mercapto-1-carboxyethyl (meth)acrylate.

(5) Carbonyl Group-Containing Monomer

Examples of a carbonyl group-containing monomer include a vinyl group-containing ketone such as vinyl methyl ketone, vinyl hexyl ketone, or methyl isopropenyl ketone.

(6) Ether Group-Containing Monomer

Examples of an ether group-containing monomer include a vinyl group-containing ether-based monomer such as vinyl methyl ether, vinyl ethyl ether, or vinyl isobutyl ether.

(7) Cyano Group-Containing Monomer

Examples of a cyano group-containing monomer include acrylonitrile, methacrylonitrile, hexene nitrile, 4-pentene nitrile, and p-cyanostyrene.

(8) Amide Group-Containing Monomer

Examples of an amide group-containing monomer include (meth)acrylamide, α-ethyl (meth)acrylamide, N-methyl (meth)acrylamide, N-butoxymethyl (meth)acrylamide, diacetone (meth)acrylamide, N,N-dimethyl (meth)acrylamide, N,N-diethyl (meth)acrylamide, N,N-dimethyl-p-styrenesulfonamide, N,N-dimethylaminoethyl (meth)acrylamide, N,N-diethylaminoethyl (meth)acrylamide, N,N-dimethylaminopropyl (meth)acrylamide, and N,N-diethylaminopropyl (meth)acrylamide.

(9) Ionic Functional Group-Containing Monomer

As an ionic functional group, either an anionic functional group or a cationic functional group may be used. Examples of the anionic functional group include a carboxy group, a sulfonic acid group, a phosphoric acid group, a phenolic hydroxy group, and salts thereof. Examples of the cationic functional group include an amino group, an imidazole group, a pyridine group, an amidino group, and salts thereof. In particular, the anionic functional group is preferable because there are many general-purpose products including the anionic functional group, there are many types thereof, and the size, shape, and the like thereof can be efficiently controlled. Furthermore, among the groups, at least one functional group selected from the group consisting of a carboxylic acid group, a sulfonic acid group, a phosphoric acid group, and derivatives thereof is preferable because of easy introduction thereof into a molecule, excellent stability thereof, and excellent safety thereof.

As compounds that can be counter ions of these ionic functional groups, examples of a compound that can be a counter ion of the anionic functional group include a metal cation, an ammonium cation, a pyridinium cation, and a phosphonium cation, and examples of a compound that can be a counter ion of the cationic functional group include a halide ion such as a chloride ion, a bromide ion, or an iodide ion.

Among the unsaturated monomers having the reactive functional groups described above, a monomer having a hydroxy group, a carboxy group, an amino group, an amide group, an alkylene oxide group, or an ionic functional group is preferable, and a monomer having a hydroxy group, a carboxy group, an ethylene oxide group, or an ionic functional group is more preferable. By using these functional groups, hydrophilicity becomes stronger, and repulsion between particles obtained in a solution becomes stronger. Therefore, stability of the dispersion system becomes higher and monodispersity can be further improved. As a result, it is possible to reduce deterioration of the particle size accuracy due to sticking or aggregation, and to obtain a polymer particle having excellent chemical resistance, reactivity, solution dispersibility, powder dispersibility, mechanical properties, and the like.

The amount of the other monomer used is preferably 0 to 50% by weight, more preferably 0 to 40% by weight, still more preferably 0 to 30% by weight, and further still more preferably 0 to 20% by weight with respect to all the monomers used for the polymerization.

Note that examples of the production method for a crosslinked polymer particle also include a method for copolymerizing (vii) or (viii) unsaturated monomer or an unsaturated monomer having the reactive group to obtain a particle, then forming an organic compound that reacts with the former reactive functional group, in the presence of at least one solvent selected from the group consisting of water and organic solvents that do not dissolve the former precipitated particle but dissolve the latter organic compound, into a state in which only a surface layer portion of the former or both the surface layer portion and an inside of the former are impregnated with the latter, and causing a crosslinking reaction to proceed by a reaction between a functional group contained in the former particle and a reactive group of the organic compound (post-crosslinking). In this case, examples of the organic compound used for post-crosslinking include an organic compound having a hydroxy group, a carboxyl group, an amino group, a thiol group, a carbonyl group, an ether group, a cyano group, an epoxy group (glycidyl group), an amide group, an isocyanate group, a carbodiimide group, an oxazoline group, or an alkylene oxide group as a reactive functional group.

In the production method of the present invention, the viscosity of the polymerization reaction solution is preferably adjusted to 1 mPa·s or more, more preferably adjusted to 2 mPa·s or more, still more preferably adjusted to 5 mPa·s or more, and most preferably adjusted to 10 mPa·s or more at 25° C. An upper limit of the viscosity is less than 10,000 mPa·s. In this case, there is no risk that the yield of a disc-shaped polymer particle will decrease. The viscosity can be easily adjusted by adjusting the viscosity of an organic solvent used or adding a polymer stabilizer or the like.

The reaction temperature during the polymerization is appropriately set depending on a solvent used and the type of polymerization initiator, but is usually about 10 to 200° C., preferably 30 to 130° C., and more preferably 40 to 90° C.

The reaction time is not particularly limited as long as being time required for a desired reaction to be almost completed, and is appropriately set depending on the type of unsaturated monomer, the compounding amount thereof, the concentration thereof, the viscosity of a solution, a target particle size, and the like, but is, for example, 1 to 72 hours, and preferably 2 to 24 hours in the above-described temperature range.

[Disc-Shaped Polymer Particles]

The disc-shaped polymer particles obtained by the method of the present invention satisfy the following condition (1) as described above.

(1) An aspect ratio (L/D) average ($P^1_{AV}$) calculated from a longest diameter (L) and a shortest diameter (D) of a flat portion is $1 \leq P^1_{AV} \leq 1.3$.

$P^1{}_{AV}$ is preferably $1 \leq P^1{}_{AV} \leq 1.25$, and more preferably $1 \leq P^1{}_{AV} \leq 1.2$. As $P^1{}_{AV}$ is closer to 1, slipperiness and fluidity are better.

The disc-shaped polymer particles preferably satisfy the following condition (2).

(2) An aspect ratio (L/T) average ($P^2{}_{AV}$) calculated from the longest diameter (L) of the flat portion and a thickness (T) of a side surface is $1.5 < P^2{}_{AV} \leq 50$. A lower limit of $P^2{}_{AV}$ is preferably 2.0, more preferably 3.0, and still more preferably 4.0. Meanwhile, an upper limit of $P^2{}_{AV}$ is preferably 30, more preferably 20, and still more preferably 10.

The disc-shaped polymer particles preferably satisfy the following condition (3).

(3) A longest diameter (L) average ($L_{AV}$) of the flat portion is $0.1 \leq L_{AV} \leq 500$ μm. A lower limit of $L_{AV}$ is preferably 0.5 μm, more preferably 1.0 μm, and still more preferably 5.0 μm. Meanwhile, an upper limit of $L_{AV}$ is preferably 100 μm, more preferably 50 μm, and still more preferably 30 μm.

The disc-shaped polymer particles preferably satisfy the following condition (4).

(4) A volume mean particle size (MV) according to a particle size distribution is $0.1 \leq MV \leq 200$ μm. A lower limit of MV is preferably 0.5 μm, more preferably 1.0 μm, and still more preferably 3.0 μm. Meanwhile, an upper limit of MV is preferably 100 μm, more preferably 50 μm, and still more preferably 25 μm. Note that in the present invention, the volume mean particle size is a value measured by a laser diffraction/scattering method and means a mean particle size in terms of a volume of spherical particles.

The disc-shaped polymer particles preferably satisfy the following condition (5).

(5) A variation width (SD) is $0.1 \leq SD \leq 30$. A lower limit of SD is preferably 0.5, more preferably 1, and still more preferably 2. Meanwhile, an upper limit of SD is preferably 25, more preferably 20, and still more preferably 15. Note that in the present invention, the variation width (SD) is a standard deviation that is a standard of a distribution width of a particle size distribution obtained by the following formula.

$$SD = (D_{84} - D_{16})/2$$

$D_{84}$: Particle size at a point where a cumulative curve is 84% (μm)

$D_{16}$: Particle size at a point where a cumulative curve is 16% (μm)

Furthermore, the disc-shaped polymer particle preferably has at least one of the characteristics of having fine unevenness on a surface of the particle, being porous, and having a relatively large specific surface area. In particular, the disc-shaped polymer particle is preferably a porous particle or a particle having fine particle satisfying the following condition (6) attached to or included in at least a surface or a surface layer portion thereof. The disc-shaped polymer particle is more preferably a particle having an uneven surface due to the fine particle.

(6) The particle size (SP) of the fine particle attached to or included in a surface or a surface layer portion of the particle is $1/1000 \times D_{AV} \leq SP \leq 1/2 \times D_{AV}$.

SP is more preferably $1/100 \times D_{AV} \leq SP \leq 1/2 \times D_{AV}$, and still more preferably $1/20 \times D_{AV} \leq SP \leq 1/2 \times D_{AV}$. The fine particle preferably contains the same component as the disc-shaped polymer particle, and is preferably attached to or included in a surface or a surface layer portion of the disc-shaped polymer particle.

Furthermore, the bulk density of the disc-shaped polymer particles is preferably 0.01 to 0.7 g/mL, more preferably 0.05 to 0.65 g/mL, and still more preferably 0.1 to 0.6 g/mL.

The disc-shaped polymer particle preferably has an affinity for at least one of water and oil, and more preferably has an affinity for both water and oil. Specifically, preferably, the water absorption amount is 50 mL or more per 100 g of the particles and/or the oil absorption amount is 60 mL or more per 100 g of the particles. More preferably, the water absorption amount is 55 mL or more per 100 g of the particles and the oil absorption amount is 70 mL or more per 100 g of the particles. Still more preferably, the water absorption amount is 60 mL or more per 100 g of the particles and the oil absorption amount is 80 mL or more per 100 g of the particles. Further still more preferably, the water absorption amount is 65 mL or more per 100 g of the particles and the oil absorption amount is 100 mL or more per 100 g of the particles.

Furthermore, the disc-shaped polymer particle is preferably a crosslinked polymer particle from a viewpoint of enhancing heat resistance and chemical resistance. A crosslinking method is not particularly limited. However, for example, by using a monomer that contributes as a crosslinking agent in a solution polymerization reaction, a crosslinked polymer particle can be obtained. Examples of such a monomer include compounds (viii) to (xii) described above as preferable examples of the unsaturated monomer. When the polymer particle of the present invention is a crosslinked polymer, 0.5 g of the polymer particles of the present invention are heated at 100° C. for two hours, and then polymer particles maintaining the initial shapes and having excellent heat resistance (having heat resistance at 100° C. or higher) can be obtained.

In particular, the disc-shaped polymer particle is preferably a (co)polymer containing a repeating unit derived from at least one monomer selected from the group consisting of (i) styrene compound, (ii) hydrocarbon group-containing (meth)acrylic monomer, (iii) fluorine-containing (meth)acrylic monomer, (iv) olefin, (v) fluorinated olefin, and (vi) conjugated diene exemplified as the hydrophobic liquid unsaturated monomers, and is more preferably a (co)polymer containing a repeating unit derived from at least one monomer selected from the group consisting of (i) styrene compound and (ii) hydrocarbon group-containing (meth)acrylic monomer as an essential unit.

Specifically, the disc-shaped polymer particle is preferably polystyrene, a styrene-(meth)acrylic acid copolymer, a styrene-(meth)acrylate copolymer, poly(meth)acrylic acid, polymethyl (meth)acrylate, polyethyl (meth)acrylate, polybutyl (meth)acrylate, a (meth)acrylic acid-methyl (meth)acrylate copolymer, a (meth)acrylate copolymer, polyvinyl acetate, poly-N-vinylpyrrole, poly-N-vinylcarbazole, poly-N-vinylindole, poly-N-vinylpyrrolidone, polyethylene, polypropylene, polyvinyl fluoride, polytetrafluoroethylene, polybutadiene, polyisoprene, a copolymer thereof, or the like, and is more preferably polystyrene, a styrene-(meth)acrylic acid copolymer, a styrene-(meth)acrylate copolymer, poly(meth)acrylic acid, polymethyl (meth)acrylate, polyethyl (meth)acrylate, polybutyl (meth)acrylate, a (meth)acrylic acid-methyl (meth)acrylate copolymer, or a (meth)acrylate copolymer. Note that the disc-shaped polymer particle may be a proper cured product copolymer using a polyfunctional crosslinking agent as described above.

[Use of Disc-Shaped Polymer Particle]

The disc-shaped polymer particles obtained by the production method of the present invention can also have excellent heat resistance and chemical resistance, and can be used for a plastic, a container, a paint, a coating film, a fiber, or a polymer molded product such as a building material. In addition, the disc-shaped polymer particles also have a UV scattering effect. Therefore, the disc-shaped polymer particles can be used for, for example, a filter, a packaging material, a container, a paint, a coating film, an ink, a fiber, a building material, a recording medium, an image display device, and a solar cell cover in order to protect UV-sensitive contents and the like, and can suppress decomposition of a compound that is unstable to light.

The disc-shaped polymer particles can be dispersed in water, a hydrophilic organic solvent, a hydrophobic organic solvent, or a solvent mixture thereof to be used as a dispersion. Here, examples of the hydrophilic organic solvent and the hydrophobic organic solvent include similar solvents to those exemplified in the production method for polymer particles.

The disc-shaped polymer particles can be used as an additive to a liquid, a coating film, a film, a plate material, or a molded product of paper or the like. A composition containing disc-shaped polymer particles obtained by the production method of the present invention can be widely used for a light scattering agent, an optical filter material, a colorant, cosmetics, an absorbent, an adsorbent, an ink, an adhesive agent, an electromagnetic wave shielding material, a fluorescent sensor, a biomarker, a recording material, a recording element, a polarizing material, a drug carrier for a drug delivery systems (DDS), a biosensor, a DNA chip, a test agent, a fired pored molded product, an anti-blocking agent, and the like.

In addition, by mixing the polymer particles having a crosslinked structure of the present invention in a precursor and then subjecting the resulting mixture to firing treatment such as curing, carbonization, or sintering, a fired pored molded product having a particle-shaped pore can also be produced.

Furthermore, blocking light or UV that enters a room, a vehicle, or the like, for example, with an interior product such as a window glass product, a curtain, or a wall material is useful in that not only sunburn of a human body and an adverse effect on the human body can be prevented, but also deterioration of ornaments and the like inside a room or a vehicle can be prevented.

The disc-shaped polymer particles are preferable as a cosmetic additive. Expansion is possible to thermoforming or use where a large amount of organic solvent is used, in which it has been difficult to add polymer particles so far while maintaining original lightness, light scattering properties, tactile sensation, flow properties, solution dispersibility, and the like of the disc-shaped polymer particles. In particular, the disc-shaped polymer particles obtained by the production method of the present invention are not obtained by physical pressure, therefore each have a shape covered with a continuous straight or curved line and a continuous flat or curved surface without an acute angle, have smooth flow properties, and are therefore most preferable for cosmetic use requiring tactile sensation.

The disc-shaped polymer particles have an adhesive force different from a general spherical particle due to a unique shape having a flat surface, and have an effect of improving a sticking force of a molded product such as a foundation and a holding force after application. Furthermore, the disc-shaped polymer particles can make the skin look bright due to optical properties thereof and can improve a covering effect by a blurring effect. In addition, the disc-shaped polymer particles have excellent spreadability on the skin due to slipperiness peculiar to the shape, further fill texture grooves finely, and thereby can make wrinkles and pores inconspicuous and can freely control flowability of the entire product. In addition, the disc-shaped polymer particles can increase the amount of a polymer added to the entire product by utilizing an adhesive force and a holding force, and can find an unprecedented cosmetic effect. The preferable addition amount is 0.1 to 50% by weight, and preferably 0.5 to 30% by weight with respect to the product compounding amount. The addition amount can be appropriately adjusted depending on use/purpose such as light scattering properties including a UV scattering effect and a blurring effect, fluidity, moldability, adhesion improvement, or finished feeling. Note that according to the studies by the present inventors, the addition amount is particularly preferably 1 to 20% by weight as a cosmetic additive. Note that the disc-shaped polymer particles may be used in combination with commercially available particles by appropriate adjustment therewith.

In particular, the disc-shaped polymer particles may be used as highly effective cosmetics, specifically as a skin care product, a hair product, an antiperspirant product, a makeup product, a UV protection product, a fragrance product, and the like. Examples thereof include basic cosmetics such as an emulsion, a cream, a lotion, a calamine lotion, a sunscreen, a makeup base, a suntan agent, an aftershave lotion, a preshave lotion, a pack material, a cleansing material, a facial cleanser, anti-acne cosmetics, and an essence, makeup cosmetics such as a foundation, a white powder, a mascara, an eye shadow, an eyeliner, an eyebrow, a cheek, a nail color, a lip cream, or a lipstick, a shampoo, a rinse, a conditioner, a hair color, a hair tonic, a setting agent, a body powder, a hair restorer, a deodorant, depilatory, a soap, a body shampoo, a bathing agent, a hand soap, and perfume. The form of a product is not particularly limited, and may be liquid, emulsion, cream, solid, paste, gel, powder, multilayer, mousse, spray, or the like. A useful effect can be expected as an additive for these cosmetics.

The disc-shaped polymer particles can be used as an additive for printing inks used for screen printing, offset printing, process printing, gravure printing, pad printing, coater, inkjet, and the like, an additive for writing instrument inks such as a marking pen, a ballpoint pen, a fountain pen, a brush pen, or a felt tip pen, and an additive for stationery items such as a crayon, a paint, and an eraser.

The disc-shaped polymer particles are preferable as an additive for paints used for brush coating, spray coating, electrostatic coating, electrodeposition coating, flow coating, roller coating, dip coating, and the like. For example, the disc-shaped polymer particles are preferable as an additive for paints used for a transportation device such as an automobile, a train, a helicopter, a ship, a bicycle, a snow vehicle, a ropeway, a lift, a hovercraft, or a motorcycle, a material for construction such as a sash, a shutter, a water storage tank, a door, a balcony, an outer panel for construction, a roofing material, stairs, a skylight, or a concrete wall, an exterior wall and interior decoration of buildings indoors and outdoors, a road member such as a guardrail, a pedestrian bridge, a soundproof wall, a sign, a highway side wall, a railway viaduct, or a bridge, a plant member such as a tank, a pipe, a tower, or a chimney, agricultural equipment such as a plastic greenhouse, a greenhouse, a silo, or an agricultural sheet, communication equipment such as a telephone pole, a power transmission tower, or a parabolic antenna, an electric device such as an electric wiring box, lighting equipment, an air conditioner outdoor device, a washing machine, a refrigerator, or a microwave oven, and an article such as a cover thereof, a monument, a tombstone, a paving material, a windshield sheet, a waterproof sheet, or a curing sheet for construction.

In addition to a solvent-type paint, the form of the paint can be any one appropriately selected from a water-dispersed paint, a non-water-dispersed paint, a powder paint, an electrodeposition-type paint, and the like as needed.

The disc-shaped polymer particles may be used in combination of two or more types thereof satisfying condition (1).

EXAMPLES

Hereinafter, the present invention is described more specifically with reference to Synthesis Examples, Examples, and Comparative Examples, but the present invention is not limited to the following Examples. Note that evaluation items in each of Example and Comparative Example were evaluated by the following methods.

(1) Volume Mean Particle Size (MV) of Polymer Particles in Terms of Volume of Precisely Spherical Particles and Variation Width (SD) Thereof Measurement was performed using MICROTRACK MT3000 (manufactured by Nikkiso Co., Ltd.).

(2) Aspect Ratio of Polymer Particle

Using an aspect ratio scanning electron microscope (S-4800 manufactured by Hitachi High-Technologies Corporation, hereinafter referred to as SEM), a photograph was taken at a measurable magnification (300 to 30,000 times). While the obtained disc-shaped polymer particles were made two-dimensional, 100 particles were randomly extracted, and a long diameter (L) of a flat portion, a short diameter (D) of the flat portion, and a thickness (T) of a side surface were measured for each of the particles.

An aspect ratio (L/D) average ($P^1_{AV}$), and an aspect ratio (L/T) average ($P^2_{AV}$) were calculated.

Similarly, an average long diameter ($L_{AV}$) of a flat portion, an average short diameter ($D_{AV}$) of the flat portion, and an average thickness ($T_{AV}$) were also calculated for the particles by randomly extracting 100 particles and measuring a long diameter (L), a short diameter (D), and a thickness (T) of a side surface for each of the particles. Note that FIG. 1 is a diagram illustrating a long diameter (L), a short diameter (D), and a thickness (T) of a disc-shaped polymer particle.

(3) Bulk Density of Polymer Particle

The bulk density of a polymer particle was calculated as loosening bulk density using the first test method (method using a graduated cylinder) defined by the three pharmacopoeias. The unit was g/mL.

(4) Measurement of Water Absorption Amount

Dried polymer particle powder was dispersed in water at a concentration of about 2% by weight, allowed to stand for one day, then dispersed again, and filtered under reduced pressure using a glass filter. The filtered glass filter was centrifuged for 30 minutes at 3,000 rpm using a centrifuge (CR-20GII manufactured by Hitachi High-Technologies Corporation). Thereafter, the obtained polymer particle powder was dried. The weight of the powder before and after drying was measured, and a difference therebetween was defined as a water absorption amount.

(5) Measurement of Oil Absorption Amount

An oil absorption amount was measured in accordance with the boiled linseed oil method described in JIS K 5101.

(6) Measurement of pH

A pH test sheet (manufactured by Whatman) was dipped in a reaction liquid being stirring, and judgement was performed by the degree of change in the color thereof.

1 Production of Disc-Shaped Polymer Particles

Example 1-1

In a 2,000 mL flask, the following components were put all at once, and the resulting mixture was stirred at room temperature (25° C., the same below) for one hour. At this time, a liquid phase was in a state where an aqueous phase portion, an emulsified phase portion, and an oil phase portion were mixed with each other, and the pH of the liquid phase was measured and was found to be 7.

| | |
|---|---|
| Water | 650.0 g |
| Ethanol | 52.0 g |
| Polypropylene glycol (#3000) | 67.5 g |
| Polyvinylpyrrolidone (K-15) | 41.5 g |
| Sucrose lauric acid ester | 7.5 g |
| Dimethyl 2,2'-azobis(isobutyrate) | 2.1 g |
| Ammonium persulfate | 3.6 g |
| Methyl methacrylate | 520.0 g |
| Ethylene glycol dimethacrylate | 0.8 g |

Next, the temperature of an oil bath was set to 75° C. Heating and stirring (200 rpm) were started under a nitrogen stream, and a polymerization reaction was performed for eight hours to obtain a methyl methacrylate-ethylene glycol dimethacrylate copolymer particle dispersion. Note that the pH of the reaction liquid before start of heating was 7, the pH of the reaction liquid two hours after the start of heating was 6, and the pH of the reaction liquid at an end of the reaction was 4.

The obtained particle dispersion was separately transferred to a 3,000 mL flask, and deposits in the synthesis container (flask and stirring blade) were checked. As a result, almost no aggregates and the like were observed, and the particle dispersion was in a clean state.

Next, the particle dispersion was filtered by a known suction filtration device. The obtained filtrate was further repeatedly washed with methanol and filtered five times, and then vacuum dried to obtain polymer particles A1.

Figure 2:
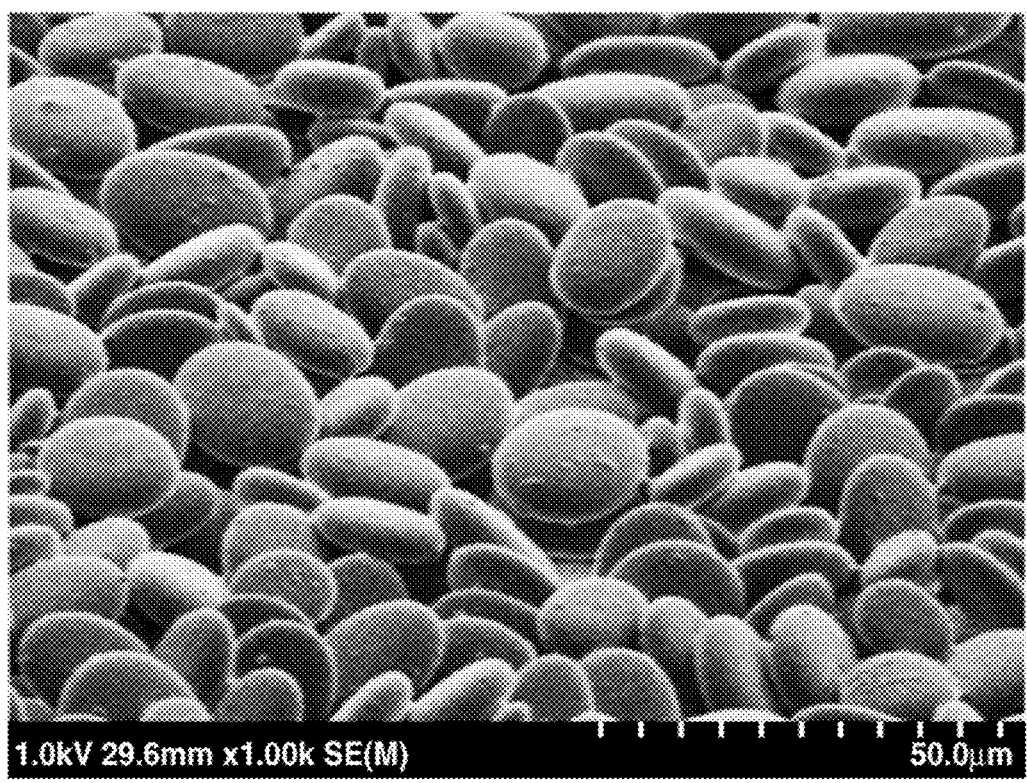
FIG. 2 is a SEM photograph (1,000×) of particles obtained in Example 1-1.

From among the obtained particles, 100 particles were randomly extracted, and the shape of each of the particles was observed with an SEM. As a result, as illustrated in FIG. 2, each of the particles was a disc-shaped polymer particle having particles with a mean particle size of 0.3 μm attached to a surface layer portion and a surface thereof. An average long diameter ($L_{AV}$) of the flat portion was 20 μm, an average short diameter ($D_{AV}$) of the flat portion was 18 μm, and an average thickness ($T_{AV}$) was 5 μm. Note that foreign matters were checked, but almost no deformations such as aggregates and sticking were observed.

Example 1-2

In a 2,000 mL flask, the following components were put all at once, and the resulting mixture was stirred at room temperature for one hour. At this time, a liquid phase was in a state where an aqueous phase portion, an emulsified phase portion, and an oil phase portion were mixed with each other, and the pH of the liquid phase was measured and was found to be 7.

| | |
|---|---|
| Water | 820.0 g |
| Methanol | 47.5 g |
| Polypropylene glycol (#3000) | 65.5 g |
| Polyvinylpyrrolidone (K-15) | 48.0 g |

| Sorbitan monooleate | 10.5 g |
|---|---|
| Azobisisobutyronitrile (AIBN) | 3.5 g |
| Ammonium persulfate | 5.5 g |
| Methyl methacrylate | 680.0 g |

Next, the temperature of an oil bath was set to 75° C. Heating and stirring (300 rpm) were started under a nitrogen stream, and a polymerization reaction was performed for eight hours to obtain a polymethyl methacrylate particle dispersion. Note that the pH of the reaction liquid before start of heating was 7, the pH of the reaction liquid two hours after the start of heating was 5, and the pH of the reaction liquid at an end of the reaction was 3.

The obtained particle dispersion was separately transferred to a 3,000 mL flask, and deposits in the synthesis container (flask and stirring blade) were checked. As a result, almost no aggregates and the like were observed, and the particle dispersion was in a clean state.

Next, the particle dispersion was filtered by a known suction filtration device. The obtained filtrate was further repeatedly washed with methanol and filtered five times, and then vacuum dried to obtain polymer particles A2.

From among the obtained particles, 100 particles were randomly extracted, and the shape of each of the particles was observed with an SEM. As a result, each of the particles was a disc-shaped polymer particle having particles with a mean particle size of 2.5 μm attached to a surface layer portion and a surface thereof.

An average long diameter ($L_{AV}$) of the flat portion was 53 μm, an average short diameter ($D_{AV}$) of the flat portion was 42 μm, and an average thickness ($T_{AV}$) was 8 μm. Note that foreign matters were checked, but almost no deformations such as aggregates and sticking were observed.

Example 1-3

In a 2,000 mL flask, the following components were put all at once, and the resulting mixture was stirred at room temperature for one hour. At this time, a liquid phase was in a state where an aqueous phase portion, an emulsified phase portion, and an oil phase portion were mixed with each other, and the pH of the liquid phase was measured and was found to be 7.

| Water | 780.0 g |
|---|---|
| Ethanol | 55.5 g |
| Polypropylene glycol (#3000) | 60.0 g |
| Polyvinylpyrrolidone (K-30) | 42.5 g |
| Sucrose lauric acid ester | 10.5 g |
| Dimethyl 2,2'-azobis(isobutyrate) | 3.5 g |
| Ammonium persulfate | 5.5 g |
| Methyl methacrylate | 680.0 g |

Next, the temperature of an oil bath was set to 75° C. Heating and stirring (300 rpm) were started under a nitrogen stream, and a polymerization reaction was performed for eight hours to obtain a polymethyl methacrylate particle dispersion. Note that the pH of the reaction liquid before start of heating was 7, the pH of the reaction liquid two hours after the start of heating was 5, and the pH of the reaction liquid at an end of the reaction was 4.

The obtained particle dispersion was separately transferred to a 3,000 mL flask, and deposits in the synthesis container (flask and stirring blade) were checked. As a result, almost no aggregates and the like were observed, and the particle dispersion was in a clean state.

Next, the particle dispersion was filtered by a known suction filtration device. The obtained filtrate was further repeatedly washed with methanol and filtered five times, and then vacuum dried to obtain polymer particles A3.

From among the obtained particles, 100 particles were randomly extracted, and the shape of each of the particles was observed with an SEM. As a result, each of the particles was a disc-shaped polymer particle having particles with a mean particle size of 0.2 μm attached to a surface layer portion and a surface thereof.

An average long diameter ($L_{AV}$) of the flat portion was 8 μm, an average short diameter ($D_{AV}$) of the flat portion was 7 μm, and an average thickness ($T_{AV}$) was 1 μm. Note that foreign matters were checked, but almost no deformations such as aggregates and sticking were observed.

Example 1-4

In a 2,000 mL flask, the following components were put all at once, and the resulting mixture was stirred at room temperature for one hour. At this time, a liquid phase was in a state where an aqueous phase portion, an emulsified phase portion, and an oil phase portion were mixed with each other, and the pH of the liquid phase was measured and was found to be 7.

| Water | 670.0 g |
|---|---|
| Methanol | 85.0 g |
| Polypropylene glycol (#2000) | 115.3 g |
| Polyvinylpyrrolidone (K-30) | 15.2 g |
| Polyethylene oxide (Mw = 100,000) | 6.5 g |
| Benzoyl peroxide | 2.1 g |
| Ammonium persulfate | 1.8 g |
| Styrene | 522.0 g |
| 2-Hydroxyethyl methacrylate | 58.0 g |

Next, the temperature of an oil bath was set to 80° C. Heating and stirring (300 rpm) were started under a nitrogen stream, and a polymerization reaction was performed for eight hours to obtain a styrene-2-hydroxyethyl methacrylate copolymer particle dispersion. Note that the pH of the reaction liquid before start of heating was 7, the pH of the reaction liquid two hours after the start of heating was 6, and the pH of the reaction liquid at an end of the reaction was 4.

The obtained particle dispersion was separately transferred to a 3,000 mL flask, and deposits in the synthesis container (flask and stirring blade) were checked. As a result, almost no aggregates and the like were observed, and the particle dispersion was in a clean state.

Next, the particle dispersion was filtered by a known suction filtration device. The obtained filtrate was further repeatedly washed with a mixed liquid of methanol and water (weight ratio=7:3) and filtered five times, and then vacuum dried to obtain polymer particles A4. Some of the obtained particles were measured with a Fourier transform infrared spectrophotometer (FT-IR8200PC manufactured by Shimadzu Corporation, the same below). As a result, an absorption peak derived from a benzene ring of styrene was observed around a wave number of 700 (1/cm), and an absorption peak derived from a hydroxy group was observed around a wave number of 3,000 (1/cm). It was confirmed that the particles were formed of a copolymer.

From among the obtained particles, 100 particles were randomly extracted, and the shape of each of the particles was observed with an SEM. As a result, each of the particles was a disc-shaped polymer particle having particles with a mean particle size of 3.5 μm attached to a surface layer portion and a surface thereof.

An average long diameter ($L_{AV}$) of the flat portion was 88 μm, an average short diameter ($D_{AV}$) of the flat portion was 82 μm, and an average thickness ($T_{AV}$) was 8 μm. Note that foreign matters were checked, but almost no deformations such as aggregates and sticking were observed.

Example 1-5

In a 2,000 mL flask, the following components were put all at once, and the resulting mixture was stirred at room temperature for one hour. At this time, a liquid phase was in a state where an aqueous phase portion, an emulsified phase portion, and an oil phase portion were mixed with each other, and the pH of the liquid phase was measured and was found to be 7.

| | |
|---|---|
| Water | 630.5 g |
| Methanol | 105.5 g |
| Polypropylene glycol (#3000) | 105.0 g |
| Polyvinylpyrrolidone (K-15) | 22.5 g |
| Sorbitan monooleate | 16.5 g |
| AIBN | 4.3 g |
| Ammonium persulfate | 5.2 g |
| Methyl methacrylate | 365.5 g |
| Glycidyl methacrylate | 64.5 g |

Next, the temperature of an oil bath was set to 80° C. Heating and stirring (400 rpm) were started under a nitrogen stream, and a polymerization reaction was performed for eight hours to obtain a methyl methacrylate-glycidyl methacrylate copolymer particle dispersion. Note that the pH of the reaction liquid before start of heating was 7, the pH of the reaction liquid two hours after the start of heating was 6, and the pH of the reaction liquid at an end of the reaction was 4.

The obtained particle dispersion was separately transferred to a 3,000 mL flask, and deposits in the synthesis container (flask and stirring blade) were checked. As a result, almost no aggregates and the like were observed, and the particle dispersion was in a clean state.

Next, the particle dispersion was filtered by a known suction filtration device. The obtained filtrate was further repeatedly washed with methanol and filtered five times, and then vacuum dried to obtain polymer particles A5.

From among the obtained particles, 100 particles were randomly extracted, and the shape of each of the particles was observed with an SEM. As a result, each of the particles was a disc-shaped polymer particle having particles with a mean particle size of 1.5 μm attached to a surface layer portion and a surface thereof.

An average long diameter ($L_{AV}$) of the flat portion was 18 μm, an average short diameter ($D_{AV}$) of the flat portion was 17 μm, and an average thickness ($T_{AV}$) was 3 μm. Note that foreign matters were checked, but almost no deformations such as aggregates and sticking were observed.

Note that some of the obtained particles were measured by a Fourier transform infrared spectrophotometer, and as a result, it was confirmed that a peak derived from an epoxy group with a wave number of 910 (1/cm) was reduced as compared with that before synthesis.

Example 1-6

In a 2,000 mL flask, the following components were put all at once, and the resulting mixture was stirred at room temperature for one hour. At this time, a liquid phase was in a state where an aqueous phase portion, an emulsified phase portion, and an oil phase portion were mixed with each other, and the pH of the liquid phase was measured and was found to be 7.

| | |
|---|---|
| Water | 850.0 g |
| Methanol | 125.5 g |
| Polypropylene glycol (#3000) | 145.6 g |
| Polyvinylpyrrolidone (K-30) | 24.5 g |
| Sucrose lauric acid ester | 12.4 g |
| AIBN | 6.9 g |
| Ammonium persulfate | 6.9 g |
| Styrene | 680.0 g |
| Divinylbenzene | 6.8 g |

Next, the temperature of an oil bath was set to 75° C. Heating and stirring (400 rpm) were started under a nitrogen stream, and a polymerization reaction was performed for eight hours to obtain a styrene-divinylbenzene copolymer particle dispersion. Note that the pH of the reaction liquid before start of heating was 7, the pH of the reaction liquid two hours after the start of heating was 5, and the pH of the reaction liquid at an end of the reaction was 4.

The obtained particle dispersion was separately transferred to a 3,000 mL flask, and deposits in the synthesis container (flask and stirring blade) were checked. As a result, almost no aggregates and the like were observed, and the particle dispersion was in a clean state.

Next, the particle dispersion was filtered by a known suction filtration device. The obtained filtrate was further repeatedly washed with methanol and filtered five times, and then vacuum dried to obtain polymer particles A6.

From among the obtained particles, 100 particles were randomly extracted, and the shape of each of the particles was observed with an SEM. As a result, each of the particles was a disc-shaped polymer particle having particles with a mean particle size of 1.5 μm attached to a surface layer portion and a surface thereof.

An average long diameter ($L_{AV}$) of the flat portion was 73 μm, an average short diameter ($D_{AV}$) of the flat portion was 60 μm, and an average thickness ($T_{AV}$) was 4 μm. Note that foreign matters were checked, but almost no deformations such as aggregates and sticking were observed.

Example 1-7

In a 2,000 mL flask, the following components were put all at once, and the resulting mixture was stirred at room temperature for one hour. At this time, a liquid phase was in a state where an aqueous phase portion, an emulsified phase portion, and an oil phase portion were mixed with each other, and the pH of the liquid phase was measured and was found to be 7.

| | |
|---|---|
| Water | 560.0 g |
| Ethanol | 48.0 g |
| Polypropylene glycol (#3000) | 59.0 g |
| Polyvinylpyrrolidone (K-15) | 55.0 g |
| Sucrose lauric acid ester | 8.5 g |
| Dimethyl 2,2'-azobis(isobutyrate) | 4.3 g |
| Ammonium persulfate | 5.2 g |
| Methyl methacrylate | 560.0 g |
| Ethylene glycol dimethacrylate | 1.6 g |

Next, the temperature of an oil bath was set to 75° C. Heating and stirring (400 rpm) were started under a nitrogen stream, and a polymerization reaction was performed for eight hours to obtain a styrene-divinylbenzene copolymer particle dispersion. Note that the pH of the reaction liquid before start of heating was 7, the pH of the reaction liquid two hours after the start of heating was 5, and the pH of the reaction liquid at an end of the reaction was 4.

The obtained particle dispersion was separately transferred to a 3,000 mL flask, and deposits in the synthesis container (flask and stirring blade) were checked. As a result, almost no aggregates and the like were observed, and the particle dispersion was in a clean state.

Next, the particle dispersion was filtered by a known suction filtration device. The obtained filtrate was further repeatedly washed with methanol and filtered five times, and then vacuum dried to obtain polymer particles A7.

Figure 3:
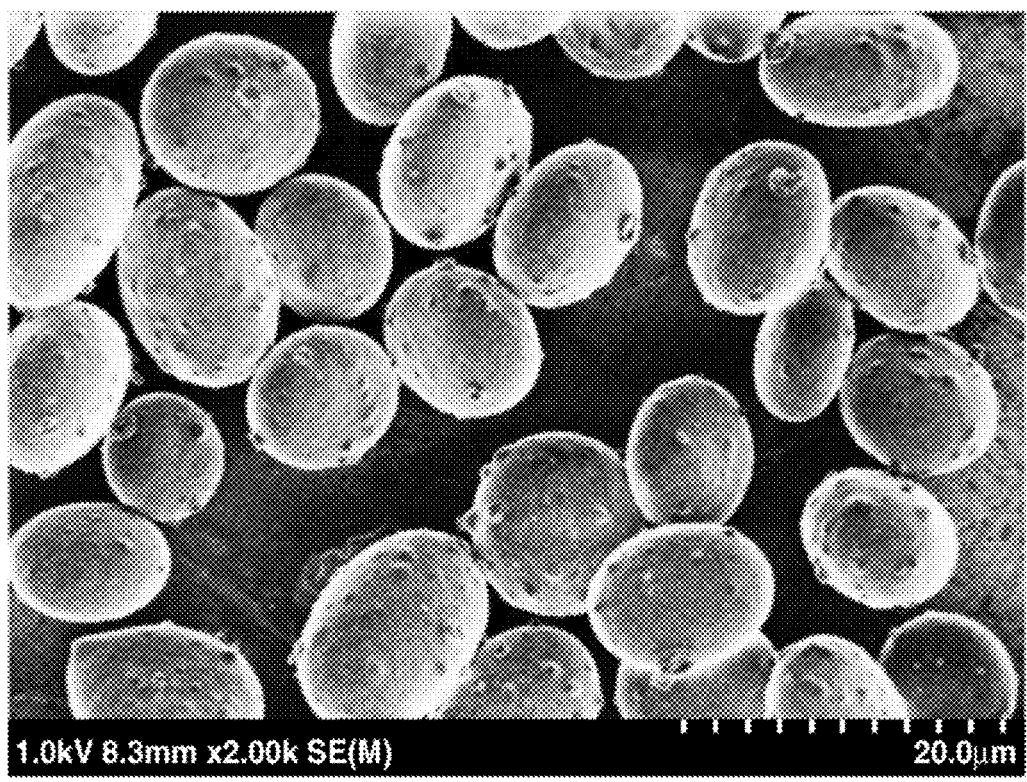
FIG. 3 is a SEM photograph (2,000×) of particles obtained in Example 1-7.

From among the obtained particles, 100 particles were randomly extracted, and the shape of each of the particles was observed with an SEM. As a result, as illustrated in FIG. 3, each of the particles was a disc-shaped polymer particle having particles with a mean particle size of 0.8 μm attached to a surface layer portion and a surface thereof.

An average long diameter ($L_{AV}$) of the flat portion was 15 μm, an average short diameter ($D_{AV}$) of the flat portion was 14 μm, and an average thickness ($T_{AV}$) was 7 μm. Note that foreign matters were checked, but almost no deformations such as aggregates and sticking were observed.

Comparative Example 1-1

In a 2,000 mL flask, the following components were put all at once, and polymer particles B1, which are methyl methacrylate-ethylene glycol dimethacrylate copolymer particles, were obtained by the same method as in Example 1-5 of WO 2016/181877.

| | | |
|---|---|---|
| | Water | 882.0 g |
| | Ethanol | 23.5 g |
| | Polypropylene glycol (#3000) | 88.0 g |
| | Polyvinylpyrrolidone (K-15) | 46.5 g |
| | Sucrose lauric acid ester | 8.5 g |
| | AIBN | 1.4 g |
| | Ammonium persulfate | 1.8 g |
| | Methyl methacrylate | 360.0 g |
| | Ethylene glycol dimethacrylate | 3.6 g |

From among the obtained particles, 100 particles were randomly extracted, and the shape of each of the particles was observed with an SEM. As a result, each of the particles was a flat elliptic spherical polymer particle. An average long diameter ($L_{AV}$) of the flat portion was 32 μm, an average short diameter ($D_{AV}$) of the flat portion was 5 μm, and an average thickness ($T_{AV}$) was 2 μm.

Comparative Example 1-2

In a 2,000 mL flask, the following components were put all at once, and polymer particles B2, which are polymethyl methacrylate particles, were obtained by the same method as in Example 1-1 of WO 2016/181877.

| | | |
|---|---|---|
| | Water | 950.0 g |
| | Methanol | 45.0 g |
| | Polypropylene glycol (#3000) | 100.0 g |
| | Polyvinylpyrrolidone (K-15) | 42.5 g |
| | Sorbitan monooleate | 12.0 g |
| | AIBN | 4.5 g |

-continued

| | | |
|---|---|---|
| | Ammonium persulfate | 9.5 g |
| | Methyl methacrylate | 600.0 g |

From among the obtained particles, 100 particles were randomly extracted, and the shape of each of the particles was observed with an SEM. As a result, each of the particles was a flat elliptic spherical polymer particle. An average long diameter ($L_{AV}$) of the flat portion was 91 μm, an average short diameter ($D_{AV}$) of the flat portion was 44 μm, and an average thickness ($T_{AV}$) was 10 μm.

Comparative Example 1-3

A methyl methacrylate-glycidyl methacrylate copolymer particle dispersion was obtained by the same method as in Example 1-5 except that the amount of methyl methacrylate put in the flask was 182.8 g and the amount of glycidyl methacrylate put in the flask was 32.3 g.

The obtained particle dispersion was separately transferred to a 3,000 mL flask, and deposits in the synthesis container (flask and stirring blade) were checked. As a result, almost no aggregates and the like were observed, and the particle dispersion was in a clean state.

Next, the particle dispersion was filtered by a known suction filtration device. The obtained filtrate was further repeatedly washed with methanol and filtered five times, and then vacuum dried to obtain polymer particles B3.

From among the obtained particles, 100 particles were randomly extracted, and the shape of each of the particles was observed with an SEM. As a result, each of the particles was a flat elliptic spherical polymer particle. An average long diameter ($L_{AV}$) of the flat portion was 25 μm, an average short diameter ($D_{AV}$) of the flat portion was 5 μm, and an average thickness ($T_{AV}$) was 2 μm.

Comparative Example 1-4

In a 2,000 mL flask, the following components were put all at once, and the resulting mixture was stirred at room temperature for one hour. At this time, a liquid phase was in a state where an aqueous phase portion, an emulsified phase portion, and an oil phase portion were mixed with each other, and the pH of the liquid phase was measured and was found to be 7.

| | | |
|---|---|---|
| | Water | 950.0 g |
| | Methanol | 45.0 g |
| | Polypropylene glycol (#3000) | 100.0 g |
| | Polyvinylpyrrolidone (K-15) | 42.5 g |
| | Sorbitan monooleate | 12.0 g |
| | Ammonium persulfate | 14.0 g |
| | Methyl methacrylate | 598.2 g |
| | Ethylene glycol dimethacrylate | 1.8 g |

Next, the temperature of an oil bath was set to 75° C. Heating and stirring (200 rpm) were started under a nitrogen stream, and a polymerization reaction was performed for eight hours to obtain a polymethyl methacrylate-ethylene glycol dimethacrylate copolymer particle dispersion.

The obtained particle dispersion was separately transferred to a 3,000 mL flask, and deposits in the synthesis container (flask and stirring blade) were checked. As a result, almost no aggregates and the like were observed, and the particle dispersion was in a clean state.

Next, the particle dispersion was filtered by a known suction filtration device. The obtained filtrate was further repeatedly washed with methanol and filtered five times, and then vacuum dried to obtain polymer particles B4.

From among the obtained particles, 100 particles were randomly extracted, and the shape of each of the particles was observed with an SEM. As a result, each of the particles was an elliptic spherical polymer particle having no flat portion. An average long diameter ($L_{AV}$) thereof was 28 μm, an average short diameter ($D_{AV}$) thereof was 7 μm, and an average aspect ratio (PAV) thereof was 4.0.

Comparative Example 1-5

In a 2,000 mL flask, the following components were put all at once, and spherical polymer particles B5, which are formed of polymethyl methacrylate with a mean particle size of 5 μm alone, were prepared by the same method as in Comparative Example 1-3 of WO 2016/181877.

| | |
|---|---|
| Water | 1386.5 g |
| Methyl methacrylate | 173.4 g |
| Lauryl peroxide | 8.6 g |
| Polyvinylpyrrolidone (K-30) | 17.3 g |

Table 1 illustrates a weight ratio (W/M) of water (W) to a hydrophobic unsaturated monomer (M), a weight ratio (O/H) of a hydrophobic organic solvent (O) to a hydrophilic organic solvent (H), a weight ratio ((O+M)/W) of the sum of the hydrophobic organic solvent (O) and the hydrophobic unsaturated monomer (M) to water (W), and a weight ratio (W/H) of water (W) to the hydrophilic organic solvent (H) in Examples 1-1 to 1-7 and Comparative Examples 1-1 to 1-5.

TABLE 1

| | | Polymer particle | Main shape | W/M | O/H | (O + M)/W | W/H |
|---|---|---|---|---|---|---|---|
| Example | 1-1 | A1 | Disc shape | 1.25 | 1.30 | 0.90 | 12.50 |
| | 1-2 | A2 | Disc shape | 1.21 | 1.38 | 0.91 | 17.3 |
| | 1-3 | A3 | Disc shape | 1.42 | 1.08 | 0.78 | 14.1 |
| | 1-4 | A4 | Disc shape | 1.16 | 1.36 | 0.95 | 7.88 |
| | 1-5 | A5 | Disc shape | 1.47 | 1.00 | 0.85 | 6.00 |
| | 1-6 | A6 | Disc shape | 1.24 | 1.16 | 0.98 | 6.77 |
| | 1-7 | A7 | Disc shape | 1.00 | 1.23 | 1.11 | 11.67 |
| Comparative Example | 1-1 | B1 | Flat elliptic spherical shape | 2.43 | 3.75 | 0.51 | 37.53 |
| | 1-2 | B2 | Flat elliptic spherical shape | 1.58 | 2.22 | 0.74 | 21.11 |
| | 1-3 | B3 | Flat elliptic spherical shape | 2.93 | 1.00 | 0.51 | 5.98 |
| | 1-4 | B4 | Elliptic spherical shape | 1.58 | 2.22 | 0.74 | 21.11 |
| | 1-5 | B5 | Spherical shape | 8.00 | — | 0.13 | — |

Table 2 collectively illustrates a shape, particle components, a volume mean particle size (MV), an average long diameter ($L_{AV}$) of a flat portion, an average short diameter ($D_{AV}$) of a flat portion, an average thickness ($T_{AV}$), an aspect ratio (L/D) average ($P^1_{AV}$), and an aspect ratio (L/T) average ($P^2_{AV}$) for polymer particles A1 to A7 and B1 to B4.

TABLE 2

| | | Polymer particle | Component | Main shape | MV (μm) | $L_{AV}$ (μm) | $D_{AV}$ (μm) | $T_{AV}$ (μm) | $P^1_{AV}$ | $P^2_{AV}$ |
|---|---|---|---|---|---|---|---|---|---|---|
| Example | 1-1 | A1 | Methyl methacrylate Ethylene glycol dimethacrylate | Disc shape | 20 | 20 | 18 | 5 | 1.11 | 4.0 |
| | 1-2 | A2 | Methyl methacrylate | Disc shape | 51 | 53 | 42 | 8 | 1.26 | 6.63 |
| | 1-3 | A3 | Methyl methacrylate | Disc shape | 8 | 8 | 7 | 1 | 1.14 | 8.0 |
| | 1-4 | A4 | Methyl methacrylate 2-Hydroxyethyl methacrylate | Disc shape | 87 | 88 | 82 | 8 | 1.07 | 11.0 |
| | 1-5 | A5 | Methyl methacrylate Glycidyl methacrylate | Disc shape | 18 | 18 | 17 | 3 | 1.06 | 6.0 |
| | 1-6 | A6 | Styrene Divinylbenzene | Disc shape | 71 | 73 | 60 | 4 | 1.22 | 18.3 |
| | 1-7 | A7 | Methyl methacrylate Ethylene glycol dimethacrylate | Disc shape | 14 | 15 | 14 | 7 | 1.07 | 1.67 |
| Comparative Example | 1-1 | B1 | Methyl methacrylate Ethylene glycol dimethacrylate | Flat elliptic spherical shape | 12 | 32 | 5 | 2 | 6.4 | 16.0 |
| | 1-2 | B2 | Methyl methacrylate | Flat elliptic spherical shape | 38 | 91 | 44 | 10 | 2.07 | 9.1 |
| | 1-3 | B3 | Methyl methacrylate Glycidyl methacrylate | Flat elliptic spherical shape | 9 | 25 | 5 | 2 | 5.0 | 12.5 |
| | 1-4 | B4 | Methyl methacrylate Ethylene glycol dimethacrylate | Elliptic spherical shape | 13 | 28 | 7 | — | 4.0 | — |
| | 1-5 | B5 | Methyl methacrylate | Spherical shape | 5 | 5 | 5 | — | 1.0 | — |

Table 3 illustrates a variation width (SD), bulk density, a water absorption amount, and an oil absorption amount for the polymer particles obtained in Examples and Comparative Examples.

TABLE 3

|  |  | Polymer particle | Main shape | SD (μm) | Bulk density (g/mL) | Water absorption amount (mL/100 g) | Oil absorption amount (mL/100 g) |
|---|---|---|---|---|---|---|---|
| Example | 1-1 | A1 | Disc shape | 3.6 | 0.33 | 75.9 | 105.6 |
|  | 1-2 | A2 | Disc shape | 9.8 | 0.41 | 79.2 | 133.6 |
|  | 1-3 | A3 | Disc shape | 2.3 | 0.23 | 87.2 | 145.3 |
|  | 1-4 | A4 | Disc shape | 14.9 | 0.48 | 158.2 | 160.7 |
|  | 1-5 | A5 | Disc shape | 3.4 | 0.3 | 60.5 | 120.6 |
|  | 1-6 | A6 | Disc shape | 12.1 | 0.43 | 59.9 | 89.1 |
|  | 1-7 | A7 | Disc shape | 3.0 | 0.27 | 80.6 | 119.2 |
| Comparative Example | 1-1 | B1 | Flat elliptic spherical shape | 3.2 | 0.38 | 89.8 | 92.6 |
|  | 1-2 | B2 | Flat elliptic spherical shape | 7.9 | 0.51 | 145.1 | 152.3 |
|  | 1-3 | B3 | Flat elliptic spherical shape | 4.2 | 0.26 | 98.3 | 100.6 |
|  | 1-4 | B4 | Elliptic spherical shape | 4.0 | 0.34 | 91.4 | 94.4 |
|  | 1-5 | B5 | Spherical shape | 1.3 | 0.72 | 57.9 | 53.3 |

2 Evaluation of Disc-Shaped Polymer Particle

Evaluation Test 1 Sensory Test and Evaluation for Adhesive Force

Polymer particles A1, A2, A3, A6, B1, B2, B4, and B5 were evaluated for touch, slipperiness, and particle adhesive force by the following methods. Results thereof are illustrated in Table 4.
(1) Touch
Feeling was evaluated according to the following criteria when particles were spread on the skin.
(2) Slipperiness
1 g of particles were placed on black synthetic leather, and the length was evaluated according to the following criteria when the particles were stretched with a finger.
(3) Particle Adhesive Force
1 g of particles were placed on black synthetic leather, and uniformly stretched with a puff. Thereafter, the synthetic leather was beaten three times. The residual particles were observed with a digital microscope (VHX200 manufactured by Keyence Corporation), and were evaluated according to the following criteria.
⊚: Very good, ○: Good, Δ: Standard, x: Poor As illustrated in Table 4, for touch and slipperiness, the disc-shaped polymer particles had a property equal to or higher than that of the flat elliptic spherical polymer particles. For a particle adhesive force, the disc-shaped polymer particles were evaluated to be equivalent to the flat elliptic spherical polymer particles.

Evaluation Test 2 Transmitted Light Analysis 1

Example 2-1

0.015 g of polymer particles A1 and 14.985 g of purified water were mixed to prepare a 0.1% by weight polymer particle dispersion A1. Polymer particle dispersion A1 was injected into a quartz cell, and transmitted light analysis was performed during particle dispersion at wavelengths of 360 nm, 500 nm, 600 nm, and 700 nm using an ultraviolet-visible spectrophotometer (UV-2450 manufactured by JASCO Corporation). Results thereof are illustrated in Table 5.

Examples 2-2 to 2-7 and Comparative Examples 2-1 to 2-5

Polymer particle dispersions 2 to 11 were prepared and transmitted light analysis was performed by the same method as in Example 2-1 except that polymer particles A1 were changed to polymer particles A2 to A7 and B1 to B5, respectively. Results thereof are illustrated in Table 5.

TABLE 4

|  |  | Polymer particle | Main shape | MV (μm) | $P^1{}_{AV}$ | Touch | Slipperiness | Particle adhesive force |
|---|---|---|---|---|---|---|---|---|
| Example | 1-1 | A1 | Disc shape | 20 | 1.11 | ⊚ | ⊚ | ⊚ |
|  | 1-2 | A2 | Disc shape | 51 | 1.26 | ○ | ○ | ⊚ |
|  | 1-3 | A3 | Disc shape | 8 | 1.14 | ⊚ | ⊚ | ⊚ |
|  | 1-6 | A6 | Disc shape | 71 | 1.22 | ⊚ | ○ | ⊚ |
| Comparative Example | 1-1 | B1 | Flat elliptic spherical shape | 12 | 6.4 | ○ | ○ | ⊚ |
|  | 1-2 | B2 | Flat elliptic spherical shape | 38 | 2.07 | ○ | ○ | ⊚ |
|  | 1-4 | B4 | Elliptic spherical shape | 13 | 4.0 | ○ | ○ | ○ |
|  | 1-5 | B5 | Spherical shape | 5 | 1 | Δ | ○ | X |

TABLE 5

| | | Polymer particle dispersion | Polymer particle | Main shape | Transmittance (%) | | | |
|---|---|---|---|---|---|---|---|---|
| | | | | | 360 nm | 500 nm | 600 nm | 700 nm |
| Example | 2-1 | 1 | A1 | Disc shape | 1.6 | 1.8 | 2.2 | 2.5 |
| | 2-2 | 2 | A2 | Disc shape | 3.0 | 4.1 | 5.9 | 6.8 |
| | 2-3 | 3 | A3 | Disc shape | 0.5 | 0.7 | 0.8 | 0.9 |
| | 2-4 | 4 | A4 | Disc shape | 4.1 | 5.1 | 7.0 | 7.8 |
| | 2-5 | 5 | A5 | Disc shape | 1.0 | 1.2 | 1.3 | 1.5 |
| | 2-6 | 6 | A6 | Disc shape | 2.8 | 3.1 | 4.3 | 5.9 |
| | 2-7 | 7 | A7 | Disc shape | 0.6 | 0.7 | 0.8 | 0.9 |
| Comparative Example | 2-1 | 8 | B1 | Flat elliptic spherical shape | 1.2 | 1.3 | 1.7 | 2.1 |
| | 2-2 | 9 | B2 | Flat elliptic spherical shape | 2.1 | 2.4 | 2.6 | 2.9 |
| | 2-3 | 10 | B3 | Flat elliptic spherical shape | 0.9 | 1.1 | 1.4 | 1.8 |
| | 2-4 | 11 | B4 | Elliptic spherical shape | 3.2 | 4.4 | 5.8 | 7.2 |
| | 2-5 | 12 | B5 | Spherical shape | 10.4 | 9.1 | 8.5 | 8.3 |

As illustrated in Table 5, disc-shaped polymer particles A1 to A7 had a better diffusion effect than spherical polymer particles B5 having no aspect ratio, and had a diffusion effect equal to or higher than that of flat elliptic spherical polymer particles B1 to B3 and elliptic spherical polymer particles B4.

Evaluation Test 3 Transmitted Light Analysis 2

Example 3-1

A composition for optical measurement sheet was prepared by mixing 15.0 g of polymer particles A1, 35.0 g of a binder resin (PVA resin manufactured by Kuraray Co., Ltd.), and 75.0 g of purified water. This composition was applied to one surface of a PET film having a thickness of 100 μm (E-5000 manufactured by Toyobo Co., Ltd.) using a commercially available bar coater, and then dried with hot air for 20 minutes by setting a dryer at 60° C. to prepare optical sheet 1 having a coating layer thickness of 40 μm. Optical sheet 1 was subjected to transmitted light analysis at wavelengths of 360 nm, 500 nm, 600 nm, and 700 nm using an ultraviolet-visible spectrophotometer. Results thereof are illustrated in Table 6.

Examples 3-2 to 3-7 and Comparative Examples 3-1 to 3-5

Optical sheets 2 to 11 were prepared by the same method as in Example 3-1 except that polymer particles A1 were changed to polymer particles A2 to A6 and B1 to B5, respectively, and transmitted light analysis was performed. Results thereof are illustrated in Table 6.

TABLE 6

| | | Optical sheet | Polymer particle | Main shape | Transmittance (%) | | | |
|---|---|---|---|---|---|---|---|---|
| | | | | | 360 nm | 500 nm | 600 nm | 700 nm |
| Example | 3-1 | 1 | A1 | Disc shape | 2.8 | 7.0 | 11.1 | 14.8 |
| | 3-2 | 2 | A2 | Disc shape | 5.1 | 9.1 | 12.2 | 16.0 |
| | 3-3 | 3 | A3 | Disc shape | 1.3 | 4.7 | 6.8 | 9.9 |
| | 3-4 | 4 | A4 | Disc shape | 5.9 | 9.6 | 12.8 | 18.3 |
| | 3-5 | 5 | A5 | Disc shape | 2.6 | 6.7 | 10.2 | 13.0 |
| | 3-6 | 6 | A6 | Disc shape | 4.6 | 8.8 | 11.5 | 15.3 |
| | 3-7 | 7 | A7 | Disc shape | 1.5 | 5.7 | 8.2 | 11.8 |
| Comparative Example | 3-1 | 8 | B1 | Flat elliptic spherical shape | 2.2 | 6.9 | 10.7 | 14.5 |
| | 3-2 | 9 | B2 | Flat elliptic spherical shape | 4.3 | 7.2 | 13.4 | 17.5 |
| | 3-3 | 10 | B3 | Flat elliptic spherical shape | 2.0 | 6.2 | 9.6 | 11.8 |
| | 3-4 | 11 | B4 | Elliptic spherical shape | 9.4 | 16.9 | 25.6 | 37.4 |
| | 3-5 | 12 | B5 | Spherical shape | 31.4 | 42.8 | 54.2 | 63.4 |

As illustrated in Table 6, also in the optical sheets, in the case of using the disc-shaped polymer particles A1 to A7, a diffusion effect better than that in the case of using the polymer particles B4 and B5 having no flat portion was obtained, and a diffusion effect equal to or higher than that in the case of using the flat elliptic spherical polymer particles B1 to B3 was obtained. It was also found that an excellent concealing property was obtained because a scattering effect was high in a region ranging from a UV region to a visible light region.

3 Preparation and Evaluation of Cosmetic Composition

Examples 4-1 to 4-3 and Comparative Examples 4-1 to 4-3

Using polymer particles A1, A2, A3, B1, B4, and B5, cosmetic compositions (foundations 1 to 6) were prepared according to the compositions illustrated in Table 7 below.

Note that for foundations 1, 2, 3, and 4, there were many opinions that "adhesion to the skin", "soft focus", and "persistence of makeup effect (four hours)" were good. In particular, for foundations 1 and 3, there were many opinions that the "fitting feeling during application" and "feeling of use" were good, and overall finish was excellent. For foundation 5, there were many opinions that the "fitting feeling during application" and "feeling of use" were good, but overall finish was slightly poor. For foundation 6, there

TABLE 7

| | | Example | | | Comparative Example | | |
|---|---|---|---|---|---|---|---|
| | | 4-1 Foundation 1 | 4-2 Foundation 2 | 4-3 Foundation 3 | 4-1 Foundation 4 | 4-2 Foundation 5 | 4-3 Foundation 6 |
| Component (g) | Red iron oxide | 0.4 | 0.4 | 0.4 | 0.4 | 0.4 | 0.4 |
| | Yellow iron oxide | 1.0 | 1.0 | 1.0 | 1.0 | 1.0 | 1.0 |
| | Black iron oxide | 0.2 | 0.2 | 0.2 | 0.2 | 0.2 | 0.2 |
| | Titanium oxide | 7.0 | 7.0 | 7.0 | 7.0 | 7.0 | 7.0 |
| | Zinc oxide | 3.0 | 3.0 | 3.0 | 3.0 | 3.0 | 3.0 |
| | Silicone-treated large particle size titanium oxide | 3.0 | 3.0 | 3.0 | 3.0 | 3.0 | 3.0 |
| | Lauroyl lysine powder | 14.0 | 14.0 | 14.0 | 14.0 | 14.0 | 14.0 |
| | Mica titanium | 4.0 | 4.0 | 4.0 | 4.0 | 4.0 | 4.0 |
| | Talc | 35.97 | 35.97 | 35.97 | 35.97 | 35.97 | 35.97 |
| | Methylphenyl poly siloxane | 2.0 | 2.0 | 2.0 | 2.0 | 2.0 | 2.0 |
| | Crystalline cellulose | 5.0 | 5.0 | 5.0 | 5.0 | 5.0 | 5.0 |
| | Corn starch | 10.0 | 10.0 | 10.0 | 10.0 | 10.0 | 10.0 |
| | Methylparaben | 0.1 | 0.1 | 0.1 | 0.1 | 0.1 | 0.1 |
| | Sodium dehydroacetate | 0.1 | 0.1 | 0.1 | 0.1 | 0.1 | 0.1 |
| | Liquid paraffin | 1.5 | 1.5 | 1.5 | 1.5 | 1.5 | 1.5 |
| | Butylene glycol | 0.5 | 0.5 | 0.5 | 0.5 | 0.5 | 0.5 |
| | Coix seed extract | 0.1 | 0.1 | 0.1 | 0.1 | 0.1 | 0.1 |
| | Carrot extract | 0.1 | 0.1 | 0.1 | 0.1 | 0.1 | 0.1 |
| | Ubiquinone | 0.03 | 0.03 | 0.03 | 0.03 | 0.03 | 0.03 |
| | Polymer particle A1 | 12.0 | — | — | — | — | — |
| | Polymer particle A2 | — | 12.0 | — | — | — | — |
| | Polymer particle A3 | — | — | 12.0 | — | — | — |
| | Polymer particle B1 | — | — | — | 12.0 | — | — |
| | Polymer particle B4 | — | — | — | — | 12.0 | — |
| | Polymer particle B5 | — | — | — | — | — | 12.0 |

Evaluation Test 4

10 persons were selected as panelists. For foundations 1 to 6, feeling of use and a difference between before and after use were comprehensively evaluated with five items of "adhesion to the skin", "fitting feeling during application", "feeling of use", "soft focus", and "persistence of makeup effect (four hours)", and whether or not each of the foundation 1 to 6 could be compounded in cosmetics was evaluated with the following A to G.

A: Foundation 1 is good
B: Foundation 2 is good
C: Foundation 3 is good
D: Foundation 4 is good
E: Foundation 5 is good
F: Foundation 6 is good
G: All of foundations 1 to 6 are the same As a result, the panelists' evaluation was
A: 4 persons
B: 1 person
C: 4 persons
D: 1 person
E: 0 person
F: 0 person
G: 0 person.

were many opinions that "soft focus", "adhesion to the skin", and "persistence of makeup effect (four hours)" were poor.

As described above, the disc-shaped polymer particles obtained by the production method of the present invention include few foreign matters such as aggregates, can be stably and efficiently produced, and can also be stably formed into crosslinkable particles. Therefore, the disc-shaped polymer particles can be applied to various uses.

In addition, the disc-shaped polymer particle has various properties that can be obtained because of a flat shape thereof, and therefore can be effectively utilized for use requiring polymer particles, such as a paint, an ink, a molded product, cosmetics, or a fired pored molded product. In particular, the disc-shaped polymer particle is useful as a material for skin cosmetics because of excellent adhesiveness, concealing property, light diffusibility, UV cut property, tactile sensation, fluidity, and the like.

4 Preparation of Various Skin Cosmetics

Prescription Examples 1 to 26

Since there are many uses and products for cosmetics in general, based on the generally disclosed cosmetics formulation, it was confirmed whether or not the disc-shaped polymer particles produced by the production method could be applied as cosmetics in skin cosmetics. As a result, it was confirmed that the disc-shaped polymer particles could be handled in the same manner as the existing polymer particles, inorganic particles, and the like, and that the disc-shaped polymer particles produced by the production method could have unique properties.

Prescription examples of skin cosmetics containing disc-shaped polymer particles A1, A2, and A3 having different mean particle sizes, and skin cosmetics containing disc-shaped polymer particles and polymer particles (polymer particles B1 and B4) having different shapes from the disc-shaped polymer particles are illustrated below. Various skin cosmetics were prepared according to the compositions illustrated in Tables 8 to 32 below. Note that a numerical value in Tables represents the content (% by weight) of each component.

(1) Powder Cosmetics

TABLE 8

| | | Prescription Example | | | | | |
|---|---|---|---|---|---|---|---|
| | Powder foundation | 1 | 2 | 3 | 4 | 5 | 6 |
| Component (% by weight) | Perfluorooctyl triethoxysilane-treated red iron oxide | 1.0 | 1.0 | 1.0 | 1.0 | 1.0 | 1.0 |
| | Perfluorooctyl triethoxysilane-treated yellow iron oxide | 4.0 | 4.0 | 4.0 | 4.0 | 4.0 | 4.0 |
| | Perfluorooctyl triethoxysilane-treated black iron oxide | 0.5 | 0.5 | 0.5 | 0.5 | 0.5 | 0.5 |
| | Perfluorooctyl triethoxysilane-treated titanium oxide | 10.0 | 10.0 | 10.0 | 10.0 | 10.0 | 10.0 |
| | Silicone-treated strong cohesive titanium oxide | 8.0 | 8.0 | 8.0 | 8.0 | 8.0 | 8.0 |
| | Aluminum hydroxide/ N-lauroly lysine-treated acicular titanium oxide | 3.0 | 3.0 | 3.0 | 3.0 | 3.0 | 3.0 |
| | Silicone-treated talc | 21.3 | 21.3 | 21.3 | 21.3 | 21.3 | 21.3 |
| | Silicone-treated talc potassium fluorosilicate fired product | 5.0 | 5.0 | 5.0 | 5.0 | 5.0 | 5.0 |
| | Boron nitride | 10.0 | 10.0 | 10.0 | 10.0 | 10.0 | 10.0 |
| | Perfluoroalkyl phosphoric acid diethanolamine-treated mica | 5.0 | 5.0 | 5.0 | 5.0 | 5.0 | 5.0 |
| | Zinc myristate-treated zinc oxide/titanium oxide-coated mica | 10.0 | 10.0 | 10.0 | 10.0 | 10.0 | 10.0 |
| | Crosslinking type silicone powder | 0.6 | 0.6 | 0.6 | 0.6 | 0.6 | 0.6 |
| | Sodium hyaluronate-treated silk powder | 1.0 | 1.0 | 1.0 | 1.0 | 1.0 | 1.0 |
| | Chlorphenesin | 0.2 | 0.2 | 0.2 | 0.2 | 0.2 | 0.2 |
| | Sodium dehydroacetate | 0.2 | 0.2 | 0.2 | 0.2 | 0.2 | 0.2 |
| | Hydrogenated castor oil isostearate | 1.0 | 1.0 | 1.0 | 1.0 | 1.0 | 1.0 |
| | Methyl polysiloxane | 4.0 | 4.0 | 4.0 | 4.0 | 4.0 | 4.0 |
| | Isocetyl myristate | 1.0 | 1.0 | 1.0 | 1.0 | 1.0 | 1.0 |
| | 2-Ethylhexyl p-methoxycinnamate | 2.0 | 2.0 | 2.0 | 2.0 | 2.0 | 2.0 |
| | Caprylic/capric triglyceride | 2.0 | 2.0 | 2.0 | 2.0 | 2.0 | 2.0 |
| | Water-soluble collagen liquid | 0.1 | 0.1 | 0.1 | 0.1 | 0.1 | 0.1 |
| | Citrus unshiu peel extract | 0.1 | 0.1 | 0.1 | 0.1 | 0.1 | 0.1 |
| | Spherical polymethyl methacrylate | 5.0 | 5.0 | 5.0 | 5.0 | 5.0 | 5.0 |
| | Polymer particle A1 | 5.0 | — | — | 3.0 | — | 3.0 |
| | Polymer particle A2 | — | 5.0 | — | — | 3.0 | 0.5 |
| | Polymer particle A3 | — | — | 3.0 | 2.0 | 1.0 | — |
| | Polymer particle B1 | — | — | — | — | 1.0 | 0.5 |
| | Polymer particle B4 | — | — | 2.0 | — | — | 1.0 |

(2) Oily Cosmetics

TABLE 9

| | | Prescription Example | | | | |
|---|---|---|---|---|---|---|
| | Lipstick | 7 | 8 | 9 | 10 | 11 |
| Component (% by weight) | Paraffin wax | 3.0 | 3.0 | 3.0 | 3.0 | 3.0 |
| | Synthetic hydrocarbon wax | 3.0 | 3.0 | 3.0 | 3.0 | 3.0 |
| | Ethylene propylene copolymer | 3.0 | 3.0 | 3.0 | 3.0 | 3.0 |
| | Ceresin | 3.0 | 3.0 | 3.0 | 3.0 | 3.0 |
| | Micro crystalline wax | 3.0 | 3.0 | 3.0 | 3.0 | 3.0 |
| | Vaseline | 5.0 | 5.0 | 5.0 | 5.0 | 5.0 |
| | Heavy liquid isoparaffin | 25.0 | 25.0 | 25.0 | 25.0 | 25.0 |
| | Di(octyldodecyl/phytosteryl/behenyl) lauroly glutamate | 10.0 | 10.0 | 10.0 | 10.0 | 10.0 |
| | Polyglyceryl triisosterarate | 5.0 | 5.0 | 5.0 | 5.0 | 5.0 |
| | Octyldodecanol | 5.0 | 5.0 | 5.0 | 5.0 | 5.0 |
| | Squalane | 5.0 | 5.0 | 5.0 | 5.0 | 5.0 |
| | Hydrogenated polydecene | 5.0 | 5.0 | 5.0 | 5.0 | 5.0 |
| | Caprylic/capric triglyceride | 13.6 | 13.6 | 13.6 | 13.6 | 13.6 |
| | Tocopherol | 0.1 | 0.1 | 0.1 | 0.1 | 0.1 |
| | Red No. 201 | 0.1 | 0.1 | 0.1 | 0.1 | 0.1 |
| | Red No. 202 | 0.1 | 0.1 | 0.1 | 0.1 | 0.1 |
| | Acicular titanium oxide | 1.0 | 1.0 | 1.0 | 1.0 | 1.0 |
| | Iron oxide | 0.5 | 0.5 | 0.5 | 0.5 | 0.5 |
| | Silica | 3.0 | 3.0 | 3.0 | 3.0 | 3.0 |
| | Mica | 2.0 | 2.0 | 2.0 | 2.0 | 2.0 |
| | Mica titanium | 1.5 | 1.5 | 1.5 | 1.5 | 1.5 |
| | Titanium oxide-coated glass flake | 2.0 | 2.0 | 2.0 | 2.0 | 2.0 |
| | Raspberry extract | 0.1 | 0.1 | 0.1 | 0.1 | 0.1 |

TABLE 9-continued

|  | Prescription Example | | | | |
|---|---|---|---|---|---|
| Lipstick | 7 | 8 | 9 | 10 | 11 |
| Polymer particle A1 | 1.0 | — | — | — | 0.3 |
| Polymer particle A2 | — | 1.0 | — | 0.5 | 0.5 |
| Polymer particle A3 | — | — | 0.5 | — | — |
| Polymer particle B1 | — | — | — | 0.5 | 0.1 |
| Polymer particle B4 | — | — | — | 0.5 | 0.1 |

(3) Oil-in-Water Emulsion Cosmetics

TABLE 10

|  | Mascara | Prescription Example | | | | |
|---|---|---|---|---|---|---|
|  |  | 12 | 13 | 14 | 15 | 16 |
| Component (% by weight) | Purified water | 43.9 | 43.9 | 43.9 | 43.9 | 43.9 |
|  | Bentonite | 1.5 | 1.5 | 1.5 | 1.5 | 1.5 |
|  | Phenoxyethanol | 0.5 | 0.5 | 0.5 | 0.5 | 0.5 |
|  | Hydroxyethyl cellulose | 2.0 | 2.0 | 2.0 | 2.0 | 2.0 |
|  | Sericite | 0.5 | 0.5 | 0.5 | 0.5 | 0.5 |
|  | PEG-20 glyceryl stearate | 5.0 | 5.0 | 5.0 | 5.0 | 5.0 |
|  | Butylene glycol | 6.0 | 6.0 | 6.0 | 6.0 | 6.0 |
|  | Boron nitride | 12.0 | 12.0 | 12.0 | 12.0 | 12.0 |
|  | Iron oxide | 2.0 | 2.0 | 2.0 | 2.0 | 2.0 |
|  | Titanium oxide | 1.0 | 1.0 | 1.0 | 1.0 | 1.0 |
|  | Triethanolamine | 1.0 | 1.0 | 1.0 | 1.0 | 1.0 |
|  | Carnauba wax | 1.0 | 1.0 | 1.0 | 1.0 | 1.0 |
|  | Bees wax | 6.5 | 6.5 | 6.5 | 6.5 | 6.5 |
|  | Cetanol | 2.0 | 2.0 | 2.0 | 2.0 | 2.0 |
|  | Stearic acid | 2.0 | 2.0 | 2.0 | 2.0 | 2.0 |
|  | Polyisobutene | 1.0 | 1.0 | 1.0 | 1.0 | 1.0 |
|  | Tocopherol acetate | 0.1 | 0.1 | 0.1 | 0.1 | 0.1 |
|  | Acrylate copolymer | 9.0 | 9.0 | 9.0 | 9.0 | 9.0 |
|  | Polymer particle A1 | 3.0 | — | — | 2.0 | 0.5 |
|  | Polymer particle A2 | — | 3.0 | 1.0 | — | 1.0 |
|  | Polymer particle A3 | — | — | 1.0 | — | 0.5 |
|  | Polymer particle B1 | — | — | — | 1.0 | 0.5 |
|  | Polymer particle B4 | — | — | 1.0 | — | 0.5 |

(4) Water-in-Oil Emulsion Cosmetics

TABLE 11

|  | Water-in-oil emulsion foundation | Prescription Example | | | | |
|---|---|---|---|---|---|---|
|  |  | 17 | 18 | 19 | 20 | 21 |
| Component (% by weight) | Diglyceryl monoisostearate | 1.0 | 1.0 | 1.0 | 1.0 | 1.0 |
|  | Polyether-modified silicone mixture | 5.0 | 5.0 | 5.0 | 5.0 | 5.0 |
|  | Volatile silicone | 15.0 | 15.0 | 15.0 | 15.0 | 15.0 |
|  | Isododecane | 5.0 | 5.0 | 5.0 | 5.0 | 5.0 |
|  | Dipentaerythrityl tri-polyhydroxystearate | 3.0 | 3.0 | 3.0 | 3.0 | 3.0 |
|  | Liquid paraffin | 6.0 | 6.0 | 6.0 | 6.0 | 6.0 |
|  | Soybean lecithin | 0.1 | 0.1 | 0.1 | 0.1 | 0.1 |
|  | Propyleneglycol dicaprylate | 4.0 | 4.0 | 4.0 | 4.0 | 4.0 |
|  | Glycerin | 3.0 | 3.0 | 3.0 | 3.0 | 3.0 |
|  | Maltitol | 3.0 | 3.0 | 3.0 | 3.0 | 3.0 |
|  | Carrot extract | 0.1 | 0.1 | 0.1 | 0.1 | 0.1 |
|  | Sambucus Nigra flower extract | 0.1 | 0.1 | 0.1 | 0.1 | 0.1 |
|  | Octyltriethoxysilane-treated titanium oxide | 10.0 | 10.0 | 10.0 | 10.0 | 10.0 |
|  | Octyltriethoxysilane-treated red iron oxide | 0.2 | 0.2 | 0.2 | 0.2 | 0.2 |
|  | Octyltriethoxysilane-treated yellow iron oxide | 0.8 | 0.8 | 0.8 | 0.8 | 0.8 |
|  | Octyltriethoxysilane-treated black iron oxide | 0.1 | 0.1 | 0.1 | 0.1 | 0.1 |
|  | Talc | 0.9 | 0.9 | 0.9 | 0.9 | 0.9 |
|  | Purified water | 40.85 | 40.85 | 40.85 | 40.85 | 40.85 |
|  | Sodium dehydroacetate | 0.05 | 0.05 | 0.05 | 0.05 | 0.05 |
|  | Phenoxyethanol | 0.3 | 0.3 | 0.3 | 0.3 | 0.3 |
|  | Crosslinking type silicone powder | 0.5 | 0.5 | 0.5 | 0.5 | 0.5 |
|  | Polymer particle A1 | 1.0 | — | — | 0.5 | 0.2 |
|  | Polymer particle A2 | — | 1.0 | — | 0.2 | 0.3 |
|  | Polymer particle A3 | — | — | 0.7 | 0.1 | 0.2 |

TABLE 11-continued

|  | Prescription Example | | | | |
|---|---|---|---|---|---|
| Water-in-oil emulsion foundation | 17 | 18 | 19 | 20 | 21 |
| Polymer particle B1 | — | — | — | 0.2 | 0.1 |
| Polymer particle B4 | — | — | 0.3 | — | 0.2 |

TABLE 12

| | | Prescription Example | | | | |
|---|---|---|---|---|---|---|
| | Sunscreen | 22 | 23 | 24 | 25 | 26 |
| Component (% by weight) | Sorbitan monoisostearate | 1.0 | 1.0 | 1.0 | 1.0 | 1.0 |
| | Polyether-modified silicone mixture | 5.0 | 5.0 | 5.0 | 5.0 | 5.0 |
| | Volatile silicone | 15.0 | 15.0 | 15.0 | 15.0 | 15.0 |
| | Isohexadecane | 5.0 | 5.0 | 5.0 | 5.0 | 5.0 |
| | Phytosteryl/isostearyl/cetyl/stearyl/behenyl dimer dilinoleate | 0.2 | 0.2 | 0.2 | 0.2 | 0.2 |
| | Octyl para-methoxy cinnamate | 5.0 | 5.0 | 5.0 | 5.0 | 5.0 |
| | Diethylamino hydroxybenzoyl hexyl benzoate | 1.0 | 1.0 | 1.0 | 1.0 | 1.0 |
| | Squalane | 3.0 | 3.0 | 3.0 | 3.0 | 3.0 |
| | Purified water | 43.6 | 43.6 | 43.6 | 43.6 | 43.6 |
| | Ethanol | 10.0 | 10.0 | 10.0 | 10.0 | 10.0 |
| | Fine particle titanium oxide | 3.0 | 3.0 | 3.0 | 3.0 | 3.0 |
| | Fine particle zinc oxide | 3.0 | 3.0 | 3.0 | 3.0 | 3.0 |
| | Titanium oxide | 1.0 | 1.0 | 1.0 | 1.0 | 1.0 |
| | Trimethyl siloxysilicate | 3.0 | 3.0 | 3.0 | 3.0 | 3.0 |
| | Phenoxyethanol | 0.2 | 0.2 | 0.2 | 0.2 | 0.2 |
| | Polymer particle A1 | 1.0 | — | — | — | 0.2 |
| | Polymer particle A2 | — | 1.0 | 0.5 | 0.6 | 0.5 |
| | Polymer particle A3 | — | — | 0.5 | — | — |
| | Polymer particle B1 | — | — | — | 0.4 | 0.2 |
| | Polymer particle B4 | — | — | — | — | 0.1 |

The invention claimed is:

1. A production method for disc-shaped polymer particles satisfying the following condition (1) that
(1) an aspect ratio (L/D) average ($P^1_{AV}$) calculated from a longest diameter (L) and a shortest diameter (D) of a flat portion is $1 \leq P^1_{AV} \leq 1.3$,
the method comprising conducting, in a solvent, solution polymerization of monomers including a hydrophobic unsaturated monomer which is liquid at 25° C., in the presence of a polymerization initiator, a surfactant, and/or a polymer stabilizer, wherein
a solvent mixture containing water, a hydrophilic organic solvent, and a hydrophobic organic solvent is used as the solvent, and
as the polymerization initiator, one or more polymerization initiators soluble in at least one of the water, the hydrophilic organic solvent, and the hydrophobic organic solvent are used as a combination that is soluble in all of the water, the hydrophilic organic solvent, and the hydrophobic organic solvent,
such that a compounding ratio among the hydrophobic unsaturated monomer, the water, the hydrophilic organic solvent, and the hydrophobic organic solvent satisfies the following conditions (A) to (C):
(A) a weight ratio (W/M) of the water (W) to the hydrophobic unsaturated monomer (M) is $0.8 \leq W/M \leq 1.5$;
(B) a weight ratio (O/H) of the hydrophobic organic solvent (O) to the hydrophilic organic solvent (H) is $0.7 \leq O/H \leq 1.8$; and
(C) a weight ratio ((O+M)/W) of the sum of the hydrophobic organic solvent (O) and the hydrophobic unsaturated monomer (M) to the water (W) is $0.6 \leq (O+M)/W \leq 1.25$.

2. The production method for disc-shaped polymer particles according to claim 1, wherein the disc-shaped polymer particles further satisfy the following condition (2):
(2) an aspect ratio (L/T) average ($P^2_{AV}$) calculated from the longest diameter (L) of the flat portion and a thickness (T) of a side surface is $1.5 < P^2_{AV} \leq 50$.

3. The production method for disc-shaped polymer particles according to claim 1, wherein the disc-shaped polymer particles further satisfy the following condition (3):
(3) a longest diameter (L) average ($L_{AV}$) of the flat portion is $0.1 \leq L_{AV} \leq 500$ μm.

4. The production method for disc-shaped polymer particles according to claim 1, wherein the disc-shaped polymer particles further satisfy the following condition (4):
(4) a volume mean particle size (MV) according to a particle size distribution is $0.1 \leq MV \leq 200$ μm.

5. The production method for disc-shaped polymer particles according to claim 1, wherein the disc-shaped polymer particles further satisfy the following condition (5):
(5) a variation width (SD) is $0.1 \leq SD \leq 30$.

6. The production method for disc-shaped polymer particles according to claim 1, wherein a disc-shaped polymer particle constituting the disc-shaped polymer particles has a shape covered with a continuous straight or curved line and a continuous flat or curved surface generated by a change in tension at an interface.

7. The production method for disc-shaped polymer particles according to claim 1, wherein the disc-shaped polymer particles are used for cosmetics.

8. The production method for disc-shaped polymer particles according to claim 1, wherein the polymerization initiator is a combination of at least one water-soluble initiator and at least one oil-soluble initiator.

9. The production method for disc-shaped polymer particles according to claim 1, wherein the hydrophobic organic solvent is an organic compound having a molecular weight of 200 or more.

10. The production method for disc-shaped polymer particles according to claim 1, wherein the hydrophobic organic solvent has ability to dissolve the hydrophobic liquid unsaturated monomer and does not have ability to dissolve a disc-shaped polymer particle generated by a polymerization reaction.

* * * * *